US012473565B2

(12) United States Patent
Zhou et al.

(10) Patent No.: US 12,473,565 B2
(45) Date of Patent: Nov. 18, 2025

(54) GLYCINE REGULATORY ELEMENTS AND USES THEREOF

(71) Applicant: SYNGENTA CROP PROTECTION AG, Basel (CH)

(72) Inventors: Ailing Zhou, Durham, NC (US); Jonathan Cohn, Durham, NC (US); Michele Susan Yarnall, Durham, NC (US); Yuejin Sun, Durham, NC (US); Zhongying Chen, Durham, NC (US); Qiudeng Que, Durham, NC (US); Yinping Lucy Qin, Durham, NC (US)

(73) Assignee: Syngenta Crop Protection AG, Basel (CH)

( * ) Notice: Subject to any disclaimer, the term of this patent is extended or adjusted under 35 U.S.C. 154(b) by 0 days.

(21) Appl. No.: 18/675,487

(22) Filed: May 28, 2024

(65) Prior Publication Data

US 2024/0401068 A1   Dec. 5, 2024

Related U.S. Application Data

(62) Division of application No. 17/772,797, filed as application No. PCT/US2020/061749 on Nov. 23, 2020, now Pat. No. 12,031,140.

(60) Provisional application No. 62/939,762, filed on Nov. 25, 2019.

(51) Int. Cl.
C12N 15/82 (2006.01)

(52) U.S. Cl.
CPC ..... *C12N 15/8222* (2013.01); *C12N 15/8271* (2013.01)

(58) Field of Classification Search
None
See application file for complete search history.

(56) References Cited

U.S. PATENT DOCUMENTS

| | | | | |
|---|---|---|---|---|
| 10,822,610 | B2 * | 11/2020 | Cigan | A01H 1/06 |
| 2009/0320160 | A1 * | 12/2009 | Li | C12N 15/8251 |
| | | | | 800/290 |
| 2015/0353957 | A1 | 12/2015 | Schultheiss et al. | |
| 2016/0194657 | A1 | 7/2016 | Bhattacharyya et al. | |

FOREIGN PATENT DOCUMENTS

| | | |
|---|---|---|
| CN | 102597244 A | 7/2012 |
| CN | 102656178 A | 9/2012 |
| CN | 104152454 A | 11/2014 |
| CN | 105916989 A | 8/2016 |
| CN | 106062198 A | 10/2016 |
| WO | 2018102816 A1 | 6/2018 |
| WO | 2019027789 A1 | 2/2019 |

OTHER PUBLICATIONS

Wells, James A. "Additivity of mutational effects in proteins." Biochemistry 29.37 (1990): 8509-8517. (Year: 1990).*
Ngo, J. Thomas, Joe Marks, and Martin Karplus. "Computational complexity, protein structure prediction, and the Levinthal paradox." The protein folding problem and tertiary structure prediction. Boston, MA: Birkhäuser Boston, 1994. 433-506. (Year: 1994).*
Ng, Pauline C., and Steven Henikoff. "Predicting deleterious amino acid substitutions." Genome research 11.5 (2001): 863-874. (Year: 2001).*
Guo, Haiwei H., Juno Choe, and Lawrence A. Loeb. "Protein tolerance to random amino acid change." Proceedings of the National Academy of Sciences 101.25 (2004): 9205-9210. (Year: 2004).*
Keskin, Ozlem, et al. "A new, structurally nonredundant, diverse data set of protein-protein interfaces and its implications." Protein Science 13.4 (2004): 1043-1055. (Year: 2004).*
Thornton, Janet M., et al. "From structure to function: approaches and limitations." nature structural biology 7.11 (2000): 991-994. (Year: 2000).*
An, G., Ebert, P.R., Yi, BY et al. Both TATA box and upstream regions are required for the nopaline synthase promoter activity in transformed tobacco cells. Molec Gen Genet 203, 245-250 (1986). https://doi.org/10.1007/BF00333961 (Year: 1986).*
Bianchi, Marzia et al. "A potent enhancer element in the 5′-UTR intron is crucial for transcriptional regulation of the human ubiquitin C gene." Gene vol. 448, 1 (2009): 88-101. doi:10.1016/j.gene.2009.08.013 (Year: 2009).*
Jan-Elo Jørgensen, Jens Stougaard, Anne Marcker, Kjeld A. Marcker, Root nodule specific gene regulation: analysis of the soybean nodulin N23 gene promoter in heterologous symbiotic systems, Nucleic Acids Research, vol. 16, Issue 1, Jan. 11, 1988, pp. 39-50, https://doi.org/10.1093/nar/16.1.39 (Year: 1988).*
De La Torre, Carola M, and John J Finer. "The intron and 5′ distal region of the soybean *Gmubi promoter* contribute to very high levels of gene expression in transiently and stably transformed tissues." Plant cell reports vol. 34,1 (2015): 111-20. doi:10.1007/s00299-014-1691-7 (Year: 2015).*
Karen M K de Vooght, Richard van Wijk, Wouter W van Solinge, Management of Gene Promoter Mutations in Molecular Diagnostics, Clinical Chemistry, vol. 55, Issue 4, Apr. 1, 2009, pp. 698-708, https://doi.org/10.1373/clinchem.2008.120931 (Year: 2009).*
Zheng, Zhenwei, et al. "5′ distal and proximal cis-acting regulator elements are required for developmental control of a rice seed storage protein glutelin gene." The Plant Journal 4.2 (1993): 357-366 (Year: 1993).*
Hernandez-Garcia, C.M., Martinelli, A.P., Bouchard, R.A. et al. A soybean (*Glycine max*) polyubiquitin promoter gives strong constitutive expression in transgenic soybean. Plant Cell Rep 28, 837-849 (2009). https://doi.org/10.1007/s00299-009-0681-7 (Year: 2009).*

(Continued)

*Primary Examiner* — Amjad Abraham
*Assistant Examiner* — Kelsey L McWilliams
(74) *Attorney, Agent, or Firm* — Dale Skalla

(57) ABSTRACT

Provided herein are regulatory elements, such as promoters and terminators, derived or obtained from various *Glycine* species. Such regulatory elements are useful for expression cassettes for plants, such as soybean. Such expression cassettes generally contain a promoter and terminator sequence to control expression of each coding sequence. For certain traits, such as insect resistance and herbicide tolerance, it may be desirable to use promoters and terminators with medium to high constitutive expression.

19 Claims, 10 Drawing Sheets

Specification includes a Sequence Listing.

(56) References Cited

OTHER PUBLICATIONS

Rodríguez-Leal, Daniel, et al. "Engineering quantitative trait variation for crop improvement by genome editing." Cell 171.2 (2017): 470-480. (Year: 2017).*

An G., et al., "Both TATA Box and Upstream Regions Are Required for the Nopaline Synthase Promoter Activity in Transformed Tobacco Cells," Molecular Genetics and Genomics, 1986, vol. 203, pp. 245-250, Retrieved from URL: https://doi.org/10.007/BF00333961.

Bianchi M., et al., "A Potent Enhancer Element in the 5'-UTR Intron is Crucial for Transcriptional Regulation of the Human Ubiquitin C Gene," Gene, 2009, vol. 448, No. 1, pp. 88-101, DOI: 10.1016/j.gene.2009.08.013.

Cornejo M-J., et al., "Activity of a Maize Ubiquitin Promoter in Transgenic Rice," Plant Molecular Biology, 1993, vol. 23, pp. 567-581, Retrieved from URL: https://doi.org/10.1007/BF00019304.

De La Torre C.M., et al., "The Intron and 5' Distal Region of the Soybean *Gmubi promoter* Contribute to Very High Levels of Gene Expression in Transiently and Stably Transformed Tissues," Plant Cell Reports, 2015, vol. 34, pp. 111-120, DOI: 10.1007/s00299-014-1691-7.

De Vooght K.M.K., et al., "Management of Gene Promoter Mutations in Molecular Diagnostics," Clinical Chemistry, Apr. 1, 2009, vol. 55, No. 4, pp. 698-708, Retrieved from URL: https://doi.org/10.1373/clinchem.2008.120931.

Extended European Search Report for European Application No. 20893020.6, mailed Feb. 26, 2024, 9 Pages.

Hernandez-Garcia C.M., et al., "A Soybean (*Glycine max*) Polyubiquitin Promoter Gives Strong Constitutive Expression in Transgenic Soybean," Plant Cell Reports, 2009, vol. 28, pp. 837-849, Retrieved from URL: https://doi.org/10.1007/s00299-009-0681-7.

Hernandez-Garcia C.M., et al., "High Level Transgenic Expression of Soybean (*Glycine max*) GmERF and Gmubi Gene Promoters Isolated by a Novel Promoter Analysis Pipeline," BMC Plant Biology, BioMed Central, London, Great Britain, Nov. 4, 2010, vol. 10, No. 1:237, 16 Pages, DOI: 10.1186/1471-2229-10-237, ISSN: 1471-2229, XP021073751.

International Preliminary Report on Patentability for International Application No. PCT/US2020/061749, mailed Jun. 9, 2022, 7 Pages.

International Search Report and Written Opinion for International Application No. PCT/US2020/061749, mailed May 4, 2021, 11 Pages.

Jorgensen J-E., et al., "Root Nodule Specific Gene Regulation: Analysis of the Soybean Nodulin N23 Gene Promoter in Heterologous Symbiotic Systems," Nucleic Acids Research, Jan. 11, 1988, vol. 16, No. 1, pp. 39-50, Retrieved from URL: https://doi.org/10.1093/nar/16.1.39.

Partial Supplementary European Search Report for European Application No. 20893020.6, mailed Dec. 4, 2023, 9 Pages.

Rodriguez-Leal D., et al., "Engineering Quantitative Trait Variation for Crop Improvement by Genome Editing," Cell, Oct. 5, 2017, vol. 171, No. 2, pp. 470-480 (20 Pages).

Zhang N., et al., "Isolation and Characterization of "GmScream" Promoters that Regulate Highly Expressing Soybean (*Glycine max*Merr.) Genes," Plant Science, Elsevier Ireland Ltd, IE, Oct. 21, 2015, vol. 241, pp. 189-198, DOI: 10.1016/J.Plantsci.2015.10.010, ISSN: 0168-9452, XP029357143, [retrieved on Dec. 1, 2015].

Zheng Z., et al., "5' Distal and Proximal Cis-Acting Regulator Elements Are Required for Developmental Control of a Rice Seed Storage Protein Glutelin Gene," The Plant Journal, 1993, vol. 4, No. 2, pp. 357-366.

* cited by examiner

SEQUENCE LISTING

```
Sequence total quantity: 31
SEQ ID NO: 1              moltype = DNA   length = 2000
FEATURE                   Location/Qualifiers
source                    1..2000
                          mol_type = genomic DNA
                          organism = Glycine sp.
SEQUENCE: 1
aaaactttca catgaatagc acgaagaatc acaatgaacg attgatcttc ttttaaaatc   60
aaatattaat tgggaaataa aaaaataaaa aatggaagtt cacaatatag tgttcgtgtg   120
cttttcatga aaactgtttt tgtaactttc agcatttttc atataattag gtcatgttgt   180
gtataattag ctataaaatt agttaaaaat ttaaaaatta gttggtaact taaagttaaa   240
aagtaactta ttaaattaaa aatattttaa taaaattaat tgttaaaata attgaaaagt   300
ataaaataac aaaaaataat aaatcaatta atttaaataa gataactagg aaaataaata   360
aaagattaaa aaaaactaaa aaactaaaaa actaaagttt taaataatgt ttaaaaatag   420
ttaaaaatta ttaaaaactt atttataaaa cagttaaatt ataaacaaac ttttcgctta   480
tgaaaaataa aagcttacct aactttagta gacaacttgt ccaacaatta gttgatacct   540
attgcccttg agttttcttt aatatcaatt attggttttg tcaacaagct atctttcaat   600
cttaatttat tggtaaaaaa tccgtcgcct tcaagttaca tcatttaaca catctgctca   660
ttagaaaaat aaaattcttc ctaaacgatt agtagaaaaa atcattttaa taatgaataa   720
```

```
gaaagaaata ttaggaaaaa ataacttcat ttaaaaaaaa catttggatt atattttact   780
ttaaaatatc taaatatttt taaatgacta attttatata cactgtaact aaaagtatac   840
aagttattat gttatgtatc ataaagaaat acttaaaaaa tctactgaag aatatcttac   900
aaagtaaaaa taaaataaga aataagttag tggaataatt atgattttat ttgaaaattg   960
aaaaaataat tattaaagaa tttagtggag taagaaagct ttccgattat tctttttttc  1020
cataataaaa aaatctagca tgacagcttt tccatagatt ttaataatgt aaaatactag  1080
tagcagccga ccgttcaggt aatggaccct ataaaatttc gaacgctcca ctccacttgc  1140
aacgagtgcg ggcccaatt taataacgcc gtcgtaacag ataaagtcca acgtgaagcg  1200
gtgaaggtgc atctctgact ccgtcaagat tacgaaaccg ctaattacga aggactcccc  1260
gaaaatgcat ccaatacga aatatcatgt gtgataagca ccaagtgaca ccatacatga  1320
gcacgcgtca caatatgatt ggagaacagt tccaccacat atgctataaa atgccccac   1380
acccctcgtc catcttcgca gttcaattcc aatcaaatta gttcattctc tttgcgcagt  1440
tccctacctc tccattcaag gttcgtaaat tttttctgtt tttctttttt cttttttcg   1500
ttattgtttg ttcttcatca gcatgatgtt gatttgattg tgttctacat agtttcatcg  1560
aatcttaatt ttcataatca gaatcagctt ttattaatgc aagaactttt taatggatg   1620
attttacaat cgtatattag gtctaattag agttttttt cataaaaaat ttcagatccg   1680
tttacaacaa gccttaattt agattctgta gtcgtagatt agggtttttt ttttcattta  1740
ttacttcaga tccgttaaag aacagcctta tttgttgata cttcagtcgt tttcaagaa   1800
attgtcagac cagttgaaaa aagcctgatt cgttgattct gtatagtttt tcaagagata  1860
ttgctcagat ctgttagcaa ctgccttatc tgttgattct atggccatag attaggggtt  1920
ttttttctctc catgaaaattg cttcttaaaa ctacgtgatg gattttgatt ctgatttatc  1980
tgtgattgtt gattctacag                                              2000

SEQ ID NO: 2           moltype = DNA  length = 2000
FEATURE                Location/Qualifiers
source                 1..2000
                       mol_type = genomic DNA
                       organism = Glycine sp.
SEQUENCE: 2
tacgaaaaac tttcacatga atagcacgaa gaatcacaat gaacgattga tcttatttta    60
aaaacaaata ttaattggga aataaaaaaa taaaaaatgg aagttcacaa tatagtgttc   120
gtgtgctttt catgaaaact gtttttgtaa ctttcagcat tttacatata attaggtcat   180
gttgggtata attagctata aaattagtta aaaatttaaa aatttgttag taacttaaag   240
ttaaaaatta acttattaaa ttaaaaatat ttaaataaca ttaactgtta aaataattga   300
aaagtataaa ataacaaaaa taatgaaatca taattaattt aaatagata actaggaaaa   360
taaataaaag attaaaaaaa taaaaaacta agtgttttaaa taatgtttat aaaaagttaa   420
aaattattaa aaattattta taaacagtt aaattataaa caaacttttc gcttatgaaa   480
aataaaagct tacctaactt tagtagacaa cttgtccaac aattagttga tacctattgc   540
ccttaaagta tcaattattg gttttgtcaa caagctatct tttaatctta atttattggt   600
aaaaaatccg tcgccttcaa gttacatcat ttaacacatc tgctcattag aaaaataaaa   660
ttcttcctaa acgattagta gaaaaaatca ttttaataat gaataagaaa gaatatttag   720
ggaaaaataa cttcatttaa aaaaacattt ggattatat ttaccttaaa atatctaaat   780
attttaaat gactaatttt ttatatttt atatacactg taactaaaag tataacaagtt   840
attatgttat gtatcataaa gaaatactta aaaaatctac tgaaaaatat cttacaaagt   900
aaaaaataaa taagaaataa gttagtggga taattatgat tttatttgaa aattgaaaaa   960
ataattatta agaatttag tggagtaaga aagatttccg attattcttt ttttccataa  1020
taaaaaaaat ctagcatgac aactttttcca tagattttaaa tagttgtaaaa tactagtagc  1080
agccgaccgt tcaggtaatg gaccctataa aatttcgaac gctccactcc acttgcaacg  1140
ggtgcgggcc ccaatttaat aacgccgtcg taacggataa agtccaacgt gaagcggtga  1200
aggtgcatct ctgactccgt caagattacg aaaccgctaa ttacgaagga ctccccgaaa  1260
atgatacga aatatcatgt gtcataagca ccaagtgaca ccatacatta gcacgcgtca  1320
caatatgatt ggagaacagt tccaccacat atgctataaa atgccccac accctcgtc   1380
catcttcgca gttcaattcc aatcaaatta gttcattctc tttgcgcagt tccctacctc  1440
tccattcaag gttcgtaaat tttttctgtt tttctgtttt tctttttc gttattgttt  1500
gttcttcatc agcatgatgt tgatttgatt gtgttttaca tagttttcatc gaatcttaat  1560
tttcataatc agaatcagct tttattaatg caagaacgtt tttaatggat gatttttacaa  1620
tcgtatatta ggtctaatta gagttttttt ttcataaaaaa atttcagatc cgttacaac   1680
aagccttaat ttagattctg tagtagtaga ttggggttttt ttttttttt atgaattact  1740
tcagatccgt taaagaacag cctttatttgt tgatacttca gtcgtttttc aagaaattgt  1800
tcagaccagt tgaaaaaagc ctgattcgtt gattctgtat agttttttcaa gagattgtc   1860
tcagatctgt tagcaactgc cttatctgtt gattctatgg ccatagatta gggttttttt  1920
ttttctctc catgaaattg cttcttaaaa ctacgagatg gattttgatt ctgatttatc   1980
tgtgattgtt gattctacag                                              2000

SEQ ID NO: 3           moltype = DNA  length = 2000
FEATURE                Location/Qualifiers
source                 1..2000
                       mol_type = genomic DNA
                       organism = Glycine sp.
SEQUENCE: 3
aattaccctc gttgtcatac ctattttaga gccaatgcat aatgatatgg acacttgttt    60
atcaaggagt taattatttt ttcttttgtt tttcacttga aaaaagatt gccatttgaa   120
ataggataac caattcttgt atttttgtat ttgacttata taactaaaaa aacaaaaatt   180
actcaaataa ttcaagtata aaattattta tataatgat taaaacatt gtttgggggt   240
gagaaattga tttaattaaa aaagagatta agttaacatg aaatagaatt aaattaaaaa   300
ctttattta aataaaataa tgttaaaaa tagaattaaa taagataact aagaaaataa   360
ataaaaatta aaaactaaaa aactaaagt ttaaaaaaat ttattttaaa taatgtttaa   420
aagggttaaa aattatttaa aaacttatttt ataaatagt taaataaact tttcactaat   480
aaaaaataaa agcttaccta accttagtag acaacttgtc caacaattag atgatgccca   540
```

```
ttgcccttta agttttcttt aacatcaatt attgttttg tcaacaagct atcttttggt    600
cttatttat  tggtgaaaaa tccgtcgcct tcaagttgcg tcggttaaca catctcctca    660
ttagaaaaat aaaattcttc cctaaacgat tagtagaaaa aatcatttaa taataaataa    720
gaaagaaaaa ttaggaaaaa aataacttca tcttaaaaaa tatttagatt atattttact    780
ttaaaatatc taaattttt  aaatgactaa ttttatatac actgtaacta gaaatataca    840
agttattatc ttatatgtct cataaagaaa tacttaaaaa atctagtgaa gaatatctta    900
caaagtaaaa aataaataag aaagaattta gtgggataat tatgatttta tttgaaaatt    960
gaaaaataat tattaaagaa tttagtggag taagaaagct ttccgattat tcttttcttg   1020
tccataataa aaaaatctag catgacggct tttccataga ttttaataat gtaaaatact   1080
attagcagct gaccgttcag gtcatggaga cagtggggtc ctataaaact tagaacgctc   1140
cacatgcaac gggtgcgggc taaaattgtg acgtgggacc caatttagtt acgccgtcgt   1200
aacagataaa accaagtgtg aagcggtgaa ggtgcatctc tgactccgtc aaaattacga   1260
aaccgctaac tacgaagggc tcacccgaaa taggaaaat  gcatccaata ccgaaatatc   1320
atgtgtgtca taagcaccaa gtgacaccat acatgcccac ggtcacaat  atgagtggag   1380
aacgattcca ccacatatgc tataaaatgc cccacaccct tcgtccttct tcgcagttca   1440
attccaatca aattagttca ttctcttttc gcatttccct acctacccct tcaaggttcg   1500
tcgatttttt ttttctttat tgtttgttct tcatcagcat gatgttgatt tgattgtgtt   1560
ttacatagtt tcatcgattc ttaatttca  taatcagatt cagcttttat tattgcaaga   1620
acgtccttaa ttgatgattt tataatcgca aattaggtct aattagagtt ttttcattaa   1680
aaaattcaga tccgtttaca acaaccttaa tcgttgattc tgtagtcgta gattagggtt   1740
ttttcatgaa ctacttcaga tccgttaaac aacacccct  tttgttgata cttcagtcga   1800
tttttcaaga aattgttcag atccgttgat caaagccttt cggtggttct gtatagtttt   1860
ttaagagata ttgctcagat ccgttagcaa ctgctttatt tgttgatttt atggccatag   1920
attagttgtt ttcttcttca tgaaactgct taaaattgtg atggattttg attctgattt   1980
atctgtgatt gaccttacag                                                2000

SEQ ID NO: 4           moltype = DNA   length = 2000
FEATURE                Location/Qualifiers
source                 1..2000
                       mol_type = genomic DNA
                       organism = Glycine sp.
SEQUENCE: 4
attcatttt  aatatgactt attgtcctaa aaaatttatt ttcgtaaatt aaataaaatg     60
aattttttct ttctttcaaa taatctaact agtcataatg agaatttgct aaaaaaaata    120
cataatgaga atcaatatta aatttattta tcaatataaa ttaatatcat tttatagaaa    180
aaataaaatt ttaaaattaa tcatatagaa ataatatttt tatattattg gttcaaatta    240
aaataatgtt aaaaaataaa atagattatt aattgatatt gatataaaat ttaaataaat    300
aatatagtga ttgttttta  ttttattaat atgtaatcaa ctaattatta tttttgaat    360
caattagtac ttaaagataa tattaattga ttttttatc  cttttaggtg gcatgtgtgc    420
tgtgagacat tatcatcaat ttaatatgat atgatacata gatatagata taaatataga    480
tatataaata tgtagattgg aatgatataa tatttttaa  atataaatta tatatatata    540
tatatatttg taatatattt tttcacatat atattttaaa aactataagt attttttcat    600
gagacaatta ttgtcgaatt gaataggttc attacttgtg agactcaatg agattttat    660
ttgtaattaa attttaaatt tgtgaaatta aaatgataaa aaatacatta aaaatcataa    720
taatataaaa aacttatatt tataatattg tgacagtaaa aaatctcttc ccattatact    780
taaaaatata aaattaaata aataggccgc gcccctagggt ttttgagaaa aaatctcttc    840
ccacgcattc aactgcactg tacgtcgtcg tttcacagc  cgcataatag aagccgcgtt    900
cccccaaccct tcctcacaac attatccggac cctcccgcac cgtcaccaaa ataaatatcc    960
acgcgctatt aggcgcgtga aactcactct aatccgaaac cacggacgt  gagaagcacg   1020
agcttttagc gagcgtttca attgtcgcta cgaaagcaga gaaagataca aactgaacta   1080
gggtaaatta gtaagggtat tttcgtaaac agaagaaaag agttgtagct ataaataaac   1140
cctctaaccc tcgtcgcatt acttctcttc acacctttgt tcactcttct tctcttgcgg   1200
ctagggtttt agcgcagctt cttcttggtt cgtattcttc caccgtttta tggattttat   1260
tccttcgatt catgtttatt ctattggttt atgttgcttg caatttatat ttctgaatc    1320
tattgttgtt gttttcaatt tatccatgt  ttcatagatc aatttttgt  gtagtatgtg    1380
cttttttcttc ttcttttccg ttcgagttgt tgttaataac ggtgctaatt gtgttttcaa   1440
aagtgttttt tatttattta ttttttgatt  gatgttttc attttggttt tgggcttta    1500
tgtgcttgtt atattcaaat ctttggatcc agatcttgta aaagtttttg gtttaagaaa   1560
gttttggct  actgttgaat agatctatta actgttactt taatcgattc aagctaaagt   1620
ttttggtta  ctgatgaata gatctattaa ctgttacttt taatcgattc agctcaagt   1680
ttttggtta  ctgatgaata gatctatata cgtcacagtg tgctaaacat gcgttatgta   1740
tgggtgtgcc acaaatttta ctgtctattt atttatcttg tggaatcata ttgtgtttga   1800
tgcgttatga ttgagcatac ctatttttca gcttgttgga tgatgtgtat ctagataatc   1860
tgatattttt acggttctga aaggttttgt aaatggcaga ggcctaatg  ttgttgaact   1920
tatttttta tttatgtggt gtgttgaact atgatggttt tgacaacttt ttctctggat   1980
ttttgcaga  tttaaggaag                                                2000

SEQ ID NO: 5           moltype = DNA   length = 2000
FEATURE                Location/Qualifiers
source                 1..2000
                       mol_type = genomic DNA
                       organism = Glycine sp.
SEQUENCE: 5
agttttttc  tttcaaagaa tctaaatggt cataatgaga attctctaaa aaaatacata     60
atgagaataa ttatggaatt tatttattaa taaaaattaa tagcatttg  atagacaatt    120
aataaaattt taaaaataac catatagaaa taataatttt tttactatcg gttccaatta    180
aaataatgat aaaaaataaa atagattatt aattgatatt gatatgaaat ttaaataaag    240
aatataatca tatattttat tgatatatga tatgatatag attaattgat attgattttg    300
atatggaatt taaaaataat ataataattg ttttattta  ttaatacgtg taatcaaata    360
```

```
attctcactt tttgaatcaa tcagtgtact taaagataat atcagttgaa tattttttat    420
cctttacgt gtgctgtgag acattatcat caattgtgtt gtatatgata tatagatata    480
gatatataaa tatatagatt gagtgatata atatatttaa aatataaatt atatatatgt    540
tttaatatat ttttgcatat atatatatat ttgtaaaaac tagaagtatt ttttcatgag    600
ataattatta tcgagttgaa taagtctatt atttgtgaga gccaaccata tttatatatg    660
tgattaaatt ttatctttgt gaaattaaaa ataataaaaa ataccttaaa atcataataa    720
tagaaaaact tatatttata atttaccatt atacttaaaa aaaattaaat aaatattata    780
aatataaata ctatcgagta atggccgcgc tagggttttt gagaaaaaat cttcccacgc    840
actcaactgc actgtacggc gtcgttttca cagccgcata atagaagccg cgttcccgaa    900
cccttcctca caacattctc ggaccctcca gcaccgtcac ccaaacaaat atccacgcgg    960
tagtaggcgc gtgaaacaaa ctctaatccg aactacgaga cgtgagaagc acgcgcttta   1020
gcgagcgttt caattgtcgc tacgaaagca gagaaggata caaacggaac tagggtaaat   1080
tagtaagggt aatttcgtaa acagaagaaa agagttgtag ctataaataa accctctaac   1140
cctcgtcgca ttacttctct tcacaccttt gttcactctt cttctccttgc ggctagggtt   1200
ttagcgcagc ttcttctagg ttcgttatct accaccgttc tatggatttt attccttcta   1260
ttcgtgttta ttctattggt ttatgttgct tgcaatatgt ttttctgaa tctgtcgtcg   1320
ttgtcttcaa ttttatccat gttcagaga tcaatttgt ttgtgtagta tgtgcttatt   1380
cttcttcttt tcgttcgagt tgttaataac ggtgctatgt tgttttcaaa agtgttttt   1440
ttattacttt tgatttaaag ttttttttggt aaggcttttta tttgcttgtt atattcaaat   1500
ctttggatcc agatcttata taagtttttg gttcaagaaa gtttttggtt actgatgaat   1560
agatctatta actgttactt taatcgattc aagctaaagt tttttggtta ctgatgaata   1620
gatctattat ctgttacttt taatcggttc aagctaaagt tttttggtta ctgatgaata   1680
gatctatata cgtcacagtg tgctaaacat gcccttgttt tatctcgatc ttatgtatgt   1740
gagtgccata aattttgtta tgtcattttt tttatctgtt ggaatcatac tgagtttgat   1800
gcgttacgat tgagcatacc tattttttggg cttgttgtat ggtgggtatt tagatcttaa   1860
tcttttttatg cttatgaaag gttttgtaat gacaaaggtc ttaatgttgt taaactttta   1920
ttttttacttt atatggtgtg ttgatgtgtt atggtttga caactttttt tttttctgga   1980
tttttgcaga tttaaggaag                                                2000

SEQ ID NO: 6          moltype = DNA   length = 2000
FEATURE               Location/Qualifiers
source                1..2000
                      mol_type = genomic DNA
                      organism = Glycine sp.
SEQUENCE: 6
attcattttt aatatgactt attgtcctaa aaaattatt ttcgtaaatt aaataaaatg      60
aatttttct ttctttcaaa taatctaact agtcataatg agaatttgct aaaaaaaata    120
cataatgaga atcaatatta aatttattta tcaatataaa ttaatatcat tttatagaaa   180
aaataaaatt ttaaaattaa tcatatagaa ataatatttt tatatattg gttcaaatta   240
aaataatgtt aaaaaataaa atagattatt aattgatatt gataaaaat ttaaataaat   300
aatataatga ttgtttttta tttattaat atgtaatcaa ctaattatta tttttttgaat   360
caattagtac ttaaagataa tattaattga tttttttat cttttaggtg gcatgtgtgc   420
tgtgagacat tatcatcaat ttaatatgat atgatacata gatatagata taaatataag   480
tatataaata tgtagattgg aatgatataa tatatttaa atataaatta tatatatata   540
tatatatttg taatatattt tttcacatat atattttaaa aactataagt atttttttcat   600
gagacaatta ttgtcgaatt gaataggttc attacttgtg agactcaatg agatttatat   660
ttgtaattaa attttaaatt tgtgaaatta aaatgataaa aaatacatta aaaatcataa   720
taatataaaa aacttatatt tataatattg tgacagtaaa aaatctcttc ccattataact   780
taaaaataaa aaattaaata aataggccgc gcccctaggg ttttgagaaa aaatctcttc   840
ccacgcattc aactgcactg tacgtcgtcg ttttcacagc cgcataatag aagccgcgtt   900
ccccaaccct tcctcacaac attatcggac cctcccgcac cgtcaccaaa ataaatatcc   960
acgcgctatt aggcgcgtga aactcactct aatccgaaca cacgagacgt gagaagcacg  1020
agcttttagc gagcgtttca attgtcgcta cgaaagcaga gaaagataca aactgaacta  1080
gggtaaatta gtaagggtat tttcgtaaac agaagaaaag agttgtagct ataaataaac  1140
cctctaaccc tcgtcgcatt acttctcttc acacctttgt tcactcttct tctccttgcgg  1200
ctagggttttt agcgcagctt cttcttggtt cgtattcttc caccgttta tggatttat   1260
tccttcgatt catgtttatt ctattggttt atgttgcttg caattatat tttctgaatc   1320
tattgttgtt gttttcaatt ttatccatgt ttcatagatc aattttgtgt gtagtatgtg   1380
cttttcttc ttctttttcg ttcgagttgt tgttaataac ggtgctaatt gtgttttcaa   1440
aagtgttttt tatttattta ttttttgattt gatgtttttc attttggttt tgggcttta   1500
tgtgcttgtt atattcaaat ctttggatcc agatcttgta aaagttttg gtttaagaaa   1560
gttttttggct actgttgaat agatctatta actgttactt taatcgattc aagctaaagt   1620
tttttggtta ctgatgaata gatctattaa ctgttacttt taatcgattc aagctaagt    1680
tttttggtta ctgatgaata gatctatata cgtcacagtg tgctaaacat gcgttatgta  1740
tgggtgtgcc acaaatttta ctgtctattt atttatcttg tggaatcata ttgtgtttga  1800
tgcgttatga ttgagcatac ctatttttca gcttgttgga tgatgtgtat ctagataatc  1860
tgatattttt acggttctga aaggtttgt aaatggcaga ggcttaatg ttgttgaact   1920
tatttttta tttatgtggt gtgttgaact atgatggttt tgcaactttt ttctctggat   1980
tttttgcaga tttaaggaag                                                2000

SEQ ID NO: 7          moltype = DNA   length = 1614
FEATURE               Location/Qualifiers
source                1..1614
                      mol_type = genomic DNA
                      organism = Glycine sp.
SEQUENCE: 7
tccaccctca caaaaaggt tattgcctaa ttaatagtag ggattgaaga agtatcaata      60
atcaataaga gggacatttg gattgacaca aactattagt ataaaaaaaa aatgtaaaac    120
taaatggaca acaatctaag aaagcgagta tgtgttgtac tcggaaaaca taacataatg   180
```

-continued

```
tgattttgat tgtggaaact gaaaacaata acaattaagt tttatttatc tcttttgccta    240
acaatttttt taattacttt ttttatagtt tttatgatga agataattaa tattttttac    300
aaatatttata ttttccttttt taccatcttt gaagataatt gcttttttt ccaatttaga   360
caaatatttg agtatcaatg atattccttt ttaatccatt attgcaattt aaaagaccat    420
caatgattac attttcaatc aaatgacttt attagtcttc actttacatc gatttaaatc    480
aaactaataa ttttgtatgg actaaatctc tgaacatttt tatatttaca acatattta     540
acatttatta ataattagt atttaatact attagtagaa aatgggagt agcaggaggg      600
aggcactgag agaatagaga tggcatggaa gtaagcaatc aagtcaaaat cagagttggc    660
caacccaaa ggctgtagta ggtaagcatg gcccatttta gttttacat tcatctctca      720
ttttcacctc aacggttcag attcaatctg actcccgat ctcagccgtg gattcaaatg     780
ccacctcagg cacatgcaat tccaaatgga tgaacctaac ccacaatcta atcttgttac    840
ttagggggctt ttccgtcatt aaatgacacc acctacccc ttctccctat aaatggcaac    900
tcaatcccc ccttagaact cgcagcgctt gatttgaggc caggcaagcc ccactcaacc    960
accacacctc tcctcgttca cgctacccct ttctgctctt cttctacctt tcaaggtact    1020
cttctttccc tctgttgctg caaccttctc tttctttaag attgcctcaa tttcggatct    1080
tgcacctctg ggttgctttg cttttgcttttt tcctctactg ggttgatttc tgtttcccta   1140
aaccggttta gacgaatgtg aacactactt cttttgttta attactctgg aatacgtgtt    1200
aggcttttcag atctagttga aatcgtattg cacttttagg gggagtttgg attttctaata  1260
agaaattgac cttttgctga gaattggttc ggtgattaga gggtttccgt aaattttga    1320
agttttacat gcttgtatct gtttattttt gtttctcaca tctattattg ttaggtgaag    1380
gaaattatgt attgagagtc tgtctgatac taaaaatataaa caccctcaata ggggctctaa 1440
cactgatttt atcatttgct gcttgtgtgt atggttaaag aaaggcaatt tgttttaat    1500
tttctgcaag ctttcgtttg ctgaattta tgcatatatt ttcctccctt ttgtgaactt     1560
ccttttttgta gttctaattc cattttttggt gtctgcagtt ttaaaagtat aaag        1614

SEQ ID NO: 8            moltype = DNA   length = 1001
FEATURE                 Location/Qualifiers
source                  1..1001
                        mol_type = genomic DNA
                        organism = Glycine sp.
SEQUENCE: 8
aatcgtgcgg gctggttcat caggggatgt tggttacaat aaatgttggt ttcttttctg     60
tactcttgtg tcttctttc taggtagctt gttttcgga caaagtttga agtctccacc      120
atcatctcgc aactgttgtt cccagaactg ggttcttgat cgacggtggc aaaattgctt    180
ttatttatct gtgttttaat gtgttgtgtt tgtcggaacc cctgattaca ttttgttaa     240
gcgcagcgag tttcaggact ttgctgcgtt gtgttgcttt ggtttattaa atgtcaactt    300
tctatttgta gtgttcaatt tttggcttgg tttgctttttt ctttataatt tgtgttcaaa   360
ttttggcttg gtttgctttt actataattt gtgttcaaat tttgggttgg attttttaac    420
gatcggctgt ttgctcttct tcctctgtt tgatgtgttc gtgactatgc aagaatcttt    480
aattttgcta aaataaactt gctttgacaa catagaatca aatccgagtg ctttaatatt    540
cggtggtttg ttttttatttt tggttttatg aaagttaaaa ttttaaaagt aaatcgataa   600
ggtataattg tggtttttat ttatcgagaa ttttttaagt gaatcgatat aatttatttc    660
ccctaaaata aaataccaaa gaatcgaatt cgaactttgt ctttaataaa actactaatt   720
taatcattat ttgttctgtg taagcatgag aaataaattc tacttatctt ttagtttaaa    780
accaaaacag gttaagaata attttttctaa ggccgttatc aaggtcacca aaaatctatt    840
cgatctgacc atatatttc gatacttgta cgattcgcag atgttgattg gaaattgcaa    900
tgaataaatt acaaatgcca aatccgatta tgcaatgaat gaattacaag tgcatttatc    960
cgttttgaat ctgttcatgt ctaccaatgg gagagatttt t                        1001

SEQ ID NO: 9            moltype = DNA   length = 1000
FEATURE                 Location/Qualifiers
source                  1..1000
                        mol_type = genomic DNA
                        organism = Glycine sp.
SEQUENCE: 9
gctggagctg atttctgtgt gatgttggat gttcccaaac attttaagaa ctgtaatgtg      60
taatgggtct gtaatgacct ttgaaaataa gtttggtttg tgttgaactc tattgtcgca    120
ttaatgttac tactgtttgt tatcaatgtg tggaactgat atataattat caactctatg    180
ttggcctatt gtgttgaatt tgttctcaa tccaatgaat tggcgtatat tagtgggttt     240
tttattcttc atgcttgtca cagatgaaaa acagggatga gttgtaagga tggtgaatca    300
tcccacgaat tagatttgg tattataatt taaagatatt attaggtagg aagaactctt     360
ggattagatt ctaaagtgat attatgaaaa cgcactaaag gattttgaac aaactgagat    420
catgatcccct agtttcaatt aacttcccct tacctagatt ttatacatat gtaagctaga   480
gtgggaacat tattcagaat cggatccgtt taacagataa aaacaaaagc gatcgggtta    540
atcccatttt tacaaataac aacgcgggtt tatacatgaa acaaatgtca ttaccaagtg    600
atattttct gctctatact ctataccgt tttattatca ttaattttgt aattatatgg      660
attaatgaaa ggttcctccc agagtgaaat tgttgtgttg gcgtgcgtgt agagcttctc    720
ttccaacaag agacaagctt gagatcgtgg agtaacctgt cccttaacgt gctctttgtt    780
atacatttca cgtgtttgca gtttgcccgg ggatcatgga atgctggcag aagttgggat    840
tgagtagcaa agttgataat ttaattatgc aggtgcagtc ttttgctgaa ttattcttca    900
aactcatgct ttctattgaa tcttatcaaa caatgtagag tagctatgac tctgtggaga   960
gtgcttggag atgtcacaat gatgctgttt ggaagggact                          1000

SEQ ID NO: 10           moltype = DNA   length = 1000
FEATURE                 Location/Qualifiers
source                  1..1000
                        mol_type = genomic DNA
                        organism = Glycine sp.
SEQUENCE: 10
```

```
atcgtgcggg ctggttcatc aggggatgtt ggttacaata aatgttggtt tattttctat    60
agtctcgtgt cttctttttct aggtagcttg ttttttcggac aaagtttgaa gtctccacca   120
tcatctcgca actgttgttc tcagaactgg gttcttgatc gacggtggca agattgcttt   180
tattaatctg tgttttaatg tgtttgtgtt tgtgagaacc cctgattaca tttttattaa   240
gcgcagcgag tttaggact ttgctgcgtt gttgctttgc ttttataaat gtcaactttc    300
tatttgtgtt caattttggc ttggatttgc ttttttacttt ataatttgtg ttcaaatttt   360
ggcttggatt tttaactat cggctgttgc tttttcttctt atgttttgat gtgttcgtga   420
ctatgcaaga atcttcaatt ttgctaaaat aaacgtgctt tgacaacata gaatgaaatt   480
cgatgcaca attcggtata attgagaaat tataattgtg gttttttatt attttgagtt   540
ttttaattga acatttccac taaaataaaa tgccgcctaa gaattgaatt tgaacttttg   600
ttttaataa aactactaat ttagtcataa tttcttctgt gtaaccatga gaaataaatt   660
atactgatct tttagtgaaa aaccaacaag gctaagaatg attttcctaa agcctttaga   720
ttagaggcca ctaaaatcta tacgatctgc ccatatattt tcgatacttg aacgattgca   780
gatgttgatt agaagttgca atgaataaat tataagtgcc caatccgatt ttcaccaaaa   840
tctatacgat ctgcccacat attttcgata cttgaacgat tgcagatgtt gattagaaat   900
tgcaatgaat aaattacaag tgccaaatcc gattttgcaa tgaatgaatt acaagtgcat   960
ttatccgttt taaatctatc catgtctacc aatgggacca                         1000

SEQ ID NO: 11        moltype = DNA   length = 1001
FEATURE              Location/Qualifiers
source               1..1001
                     mol_type = genomic DNA
                     organism = Glycine sp.
SEQUENCE: 11
attcaatcaa accgttcatg cttaatcaag ttgggaacaa caaaaaaaat caaaacaatg    60
tttctgggtt tcggtttcat ttcatcaaga tgatctgatt atcttttttt ttttaatttt   120
aatttaaagt ctttgtattt tgtatgtaaa gatgtaaaat tatgattatt aggtggtgca   180
tgtgttgcgt catgggccaa tgttatcctc tgcttttaag ttggaagagg cccagctcac   240
gtgtgatgta cggctgtgat tgtgtaattt gcaaaatcaa aaataacccc cgagtcatat   300
atgcatcttt ttattttatt ttattttatc ttattattga catattaga cacctttttaa   360
aattatgatg atcatctcta aagcaaggta tgaccataat ttttccaaat tgcttttat   420
aactgatttt ggttcatctc ttagaattga ttttggttca gattccaaac atcctttata   480
ttgctactat tttattttc ttttgacccc ccctatgtct tctctctaat atttgtcctc   540
ttccccgaag catatgccaa ggttgggttt cttatccgac gcctgtgccc gttatcactt   600
gctatggata attgaaatcc gtggacagtg aggagtgggg ttggtttaag gtgggtgggt   660
ggatgatgtc tattgcttaa atatgggacc acttttcttc ctcaataatg catatattct   720
agtgttgtcc atttaataat gattcgtgat catagcctg ggaaaaaat gtacactatt   780
tttatatttt tatgccaaaa tttggacaag cttgatctta tcagcttcag cggggaatgc   840
cacttccttc tagttacttc catggaatcc ttcgcggaaa agacgtggca cttgtgagat   900
gagtaactga gaagaaagca ttagtaattt gacacgtata aatcgttgac tcattcttgt   960
gatttagcat ttgcctatta tttttatcaa atgccaacta g                      1001

SEQ ID NO: 12        moltype = DNA   length = 600
FEATURE              Location/Qualifiers
source               1..600
                     mol_type = genomic DNA
                     organism = Glycine sp.
SEQUENCE: 12
ttcaatcaaa cggttcatga gtaatcaagt tgggacaaca acaaaaaaaa tcaagccaat    60
gtttgtgggt tttggtttca tttcattaag atgatctgtt tatctcttct tttttttttc   120
ttttttaaa tttaaagtct ttgtgattttt gtatgtaaag atgtaaaatt atgattatta   180
ggtggtgcat gtgttgcgtc atgggccaat gttatcctct gcttttaagt tggaagaggc   240
ccagcttatg tgtaatgtac ggctgtgatt gtgtaattta atttgcaaaa tcaaaaataa   300
caccagaggc atctctttat tttctctgga ccccaccatg tcttctatgt aatatttgtt   360
gtcctcttcc ccgaagtata tgccaaggtt gggtttcttt atccacgcct gtgcccgtta   420
tcacttgcta tggataattg aaatccggtg agagttagga gtgggttgc gtgggtgggt   480
gggtgggtga tgtctcttgc ttaatatggg accacttttc ttcgtcaata atgcacatat   540
tctagggttg tccatttaat aatgattgt gatcatagcc ttggggaaaa accgtacact   600

SEQ ID NO: 13        moltype = DNA   length = 1000
FEATURE              Location/Qualifiers
source               1..1000
                     mol_type = genomic DNA
                     organism = Glycine sp.
SEQUENCE: 13
ttcaatcaaa cggttcatgc ttaatcaagt tgggaacaac aaaaaatcaa acaaagttt    60
gtgggtttcg gttcatttc atcaagatga tctgtttatc tttttttttt ttttaatttt   120
aaagtctttg tattttgtat ttaaagatgt aaaattatga ttattaggtg gtgcatgtgt   180
cgcgtcatgg gccaatgtta ttcctctgctt taagttgga agaggcccag ctcatctgtg   240
atgtacggct gtgattgtgt aatttgcaaa atcaaaaata accccgagt catatatgct   300
tcttttattt tatccttatt attaacatat ttagatacct tttaaatta tgataattat   360
ctctaaaaca aggtctgacc ataatttttc caaattgctt tacatttttt agtgatttta   420
tagctgatttt tggttcatct cttagaattg atttcggttc agctcacggt ctttccaaac   480
atactatata ttgctactac tttattttct ctagaccccc ctatgtcttc tctctaatat   540
ttgtcctctt ccccgaagta tatgccaagg ttgggtttct ttatccactc ctgtgcccgt   600
tattactttg ctatggataa ttgaaatcag gggagagtga ggagtgggt tggtttaagg   660
tgggtgagtg ggtggatgat gtctattgct taaatatggg accacttttc ttcctcaata   720
atgcacgtat tctagtgttg tccatttaat aatgattcgt gatcatagcc ttgggaaaaa   780
aacgtacaat atttttata ttttgtgcta aaatttggac aagcttgatc ttatcagctt   840
```

```
cggcgggaa tgcctcttcc ttctagttac ttccatggaa tccttcacgg aaaagacgtg   900
gcacttgtgg gatgggtaac tgagtagaaa tcatcagtaa ttttgacacg tataaattgt   960
tgactcaatc ttgtgattta gcatttgctt tttatttta                         1000

SEQ ID NO: 14           moltype = DNA  length = 999
FEATURE                 Location/Qualifiers
source                  1..999
                        mol_type = genomic DNA
                        organism = Glycine sp.
SEQUENCE: 14
gctggagctg atttctgtgt gatgttggat gttcccaaac attttaggaa ctgtaatgtg    60
taatgggtct gtaatgacct ttgaaaataa gtttggtttg tgttgaactc tattgtccca   120
tcaatgttac tactgcttgt tatcaatgtg tggaattgat atataattat caactctatg   180
ttggcctgtg gtgttgaatt ttgttctcaa tccagtgaat tggcgatccg tttaacagtt   240
aaaaacaaaa gcgatcgggt taatcccatt tttacagata acaacgcagg tttatacatg   300
aaacaaatgt cattaccaat tgatatttt ctgctctata ctctataccc ttttattat    360
cattaatttt gtaattatat ggattaataa aaggttcctc ccagagttaa attgttgtgc   420
gagggtggca ttgaaaatac atttcacgtg tttgcagttt accgaggatc atggaatgct   480
agcagaagtt ggggttgagt agcaaagttg ataatttaat tatatgcagg tgcagtcttt   540
tgctgaattc ttcttcaaac tcatgctttc tattgaattt tatcaacaat gtggagtgct   600
atgacctgtg gagagtgctt ggagatgtca caatgatgct gtttgggaag ggactatcac   660
ggattccgcc atcgtgatca acagagttga catgtttttat caaaattggg ttcgtgcaca   720
acaatcaaat aaatttagac aggttgcaga attaatggag gtgaatgatt cttgagtcc   780
gtcgactttg gaaggttaaa atgtaacctt gatgcatctc tcaaccatgt tcaaaactgc   840
acagcttttg gtttatgcgt tcgggcatct tattgttgcc agaactgatg ttgtgaaacc   900
atgcatgcct gttatggagg gtgaggcgtt agggttgcag ttggcgattc agtttgttct   960
atatgcggga atgcaaaatg tggactttga aacagattg                         999

SEQ ID NO: 15           moltype = DNA  length = 1000
FEATURE                 Location/Qualifiers
source                  1..1000
                        mol_type = genomic DNA
                        organism = Glycine sp.
SEQUENCE: 15
atcgtgcggg ctggttcatc agggatgtt ggttacaata aatgttggtt tattttctat    60
agtcttgtgt cttctttct aggtagcttg ttttcggac aaagtttgaa gtctccacca   120
tcatctcgca actgttgttc tcagaactgg gttcttgatc gacggtggca agattgcttt   180
tattaatctg tgttttaatg tgtttgtgtt tgtgagaacc cctgattaca tttttattaa   240
acgcagcgag ttttaggact ttgctgcgtt gttgcttgtc tttttttaaat gtcaactttc   300
tatttgtgtt caattttggc ttggattttgc ttttacttta taatttgtgt tcaaattttg   360
gcttggattt tttaactatc ggctgttgct tttcttccta tgttttgatg tgttcgtgac   420
tatgcaagaa tcttcaattt tgctaaagta acgtgcttg gacaacatag aatgatattc   480
gagtgcacaa ttcgttataa ttgagaagtt ataattgtg tttttattta ttttgtgagt   540
ttttaattg aacatttcca ctaaaataaa atgccgtcta agaattgaat tctaacttttt   600
gttttaataa aactactaat ttagtcataa tttcttctgt gtaagcatga gaaataaatt   660
atactgatct tttagggata aaccaacaag gctaagaatg agttttctaa ggcctgtaga   720
ggcaccaaaa atctatacga tctgcccata tattttcgat agttgaacta ttccagatat   780
tgattggaaa ttgcaatgaa taaattacaa gtgcctaatc cgattttgca atgaatgaat   840
tacaagtgca tttatccgtt ttaaatcaat ccatgtctac caatgggacc agtaaaagcc   900
caagcagata tcatagtgca tggtgcatac accaaacggt ttatagccag tcccgaagct   960
caggcttta catatatcgt tgcagcctat tgttagaaga                         1000

SEQ ID NO: 16           moltype = DNA  length = 999
FEATURE                 Location/Qualifiers
source                  1..999
                        mol_type = genomic DNA
                        organism = Glycine sp.
SEQUENCE: 16
gctggagctg atttctgtgt gatgttggat gttcccaaac attttgagaa ctgtaatgtc    60
taatgggtct gtaatgacct ttgaaaataa gtttggtttg tgttgaactc tattgtccca   120
tcaatgttac tactgtttgt tatcactgtg tggaattgat atataattat caactctatg   180
ttggcatgtt gtgttgaatt ttgttctcaa tccagtgaat tggcgtatat tagtgggttt   240
tttattcttc atgtttgtca cggaggaaaa acagggatga gttgtaagga tggtgatcat   300
tccacgaatt agattttggt atggtaggtt aaagatatta tggtagggg agaacttttg   360
gattagattc taaagtgata ttatgtaaac gcactaaagg attttgaaca aacagatcat   420
gaccccctagt ttcaattagc tgcccattac ctagatttta tacatatgta tgctagagtt   480
ggaacattag tcagaatcgg atccgtttaa cagataaaaa caaaagcgat cgggttaatc   540
ccattttac agataacaac gcaggtttat acatgaaaca aatgtcatta ccaattgata   600
tttttctgct ctatactcta taccctttt attatcatta attttgtaat tatatgatt    660
aataaaaggt tcctcccaga gttaaattgt tgtgttgggg tgcgtgtaga gcttgagatc   720
gtggtacctg tcccttaacg tgctctttgt gcgagggtgg cattgaaaat acatttcacg   780
tgtttgcagt ttaccgagga tcatggaatg ctggcggaag ttgggggttga gtagcaaagt   840
tgataattta attatgcagg tgcagtcttt tgctgaattc ttcttcaaac tcatgcattc   900
tattgaattt tatcaacaat gtagagtagc tatgacctgt ggagagtgct tggagatgtc   960
acaatgatgc tgtttgggaa gggactatca cggattccg                         999

SEQ ID NO: 17           moltype = DNA  length = 999
FEATURE                 Location/Qualifiers
source                  1..999
```

```
                       mol_type = genomic DNA
                       organism = Glycine sp.
SEQUENCE: 17
gctggagctg atttctgtgt gatgttggat gttcccaaac attttaagaa ctgtaatatg    60
ggtctgtaat gaccttttgaa aataagtttg gtttgtttg aactctattg tcccatcaat   120
gttactactg tttgttatca atgtgtggaa ctgatatata attatcaact ctatgttggc   180
ctattgtgtt gaattttgtt ctgaattggc gtatattagt ggatttttta ttcttcaagc   240
ttgtcacgga ggaaaaacag ggatgagttg taaggatggt gatcatccca cgaattagat   300
tttggtatag taggttaaag atattattag gtagggagaa cttttggatt agattctaaa   360
gtgatattat ggaaacgcat taaaggattt tgaacaaatt gagatcatga tccctagttt   420
caattagctg cccattacct agatttttata catatgtaag ctatctgcta gagttggaac   480
attcatcaga atcggatccg tttaacagat aaaaacaaaa gcgattgggt taatcccatt   540
tttacagata acaacgcagg tttatacatg aaacaaatgt cattaccaag tgatatttt   600
ctgctctata ctctatatcc ttttttattat cattaattat gtaattatat ggattaatta   660
aaggttcctc ccagagttaa attgttgtgt tgggggtgcgt gtagagcttc tcttccaaca   720
agagacaagc ttgagatcac ggagtaacct gtcccttaac gtgctctttg tgcaagggtg   780
gcattgaaaa tacatttcac gtgtttgcag tttacccgag gatcatggaa tgctggcaga   840
agttggggtt gagtatgcaa gttgataatt taattactga ggtgcagtct tttgctgaat   900
tcttcttcaa actcatgctt cctattgaat cttatcaaca atgtagagta gctatgacct   960
gtggagagtg cttggagatg tcacaatgat gctgtttgg                          999

SEQ ID NO: 18          moltype = DNA  length = 1000
FEATURE                Location/Qualifiers
source                 1..1000
                       mol_type = genomic DNA
                       organism = Glycine sp.
SEQUENCE: 18
ggccattcat tccacaccgc tctgtgctga gagtttttg agcgttgccc ttataatatg     60
tctaatatat ccataatttt tccacgtctc ttactctgtg tgtgtgttc tctcctcttc   120
ctcctatttt gttattttgta tgttcttttg taattttttca catgatcaac taaaaacatg   180
tactctctgt ttgtatgccc tacccatgtg tctcttaata tcaatataaa gaagagtgtt   240
caagttaatg tttggattcc aatgcttctc tcgatgaact cgcgtgcatt ttttaaata   300
cttattgttt ctcccaattc cgaaaagttc gagctgcaaa tttggacaga tgataaatgg   360
taggcaagtg tggtgttgtt tacataaaaa ctgctaaaac taaggtgtta aatattactg   420
gtcatgtaag atattgtttc ctaagtttat atttagtagt aaatatagt tacactatta    480
aacaaagtaa aaccttttaa aaaaaataaa caaagtaaat catattttgt cacgtctttc   540
agaaacaaag ctactgacat ttttttacttg ctaattattg tagtatcatg ttattgttgg   600
ttttcgttta cttcccgtct tcatcaccat tggtattgag aaaacaagtt tgaacaatgt   660
gcacatttcg agaacaacga ccacttgatt aagtactagg tcaaatttca gggagtaata   720
atttattatt tctcatttaa ttttatgatt tatttttgt ccgaaaaata ggaaatcttc   780
tctaaaattt attaatctat tgattggtag accatcgtgc tgctatggcc cctaatatat   840
aaaatgtgac ttctgaagtg gtatgatggt ttttttttt cttgtttatg taagacaagg   900
ttcggacaga tgcagatttt acattaacaa taatcctctg tttgtttgta gacttgtagt   960
ggaaaaaaaa atgaacaaat aagattcaat attgtatttt                         1000

SEQ ID NO: 19          moltype = DNA  length = 1001
FEATURE                Location/Qualifiers
source                 1..1001
                       mol_type = genomic DNA
                       organism = Glycine sp.
SEQUENCE: 19
gggcttgatg tcgttgatta gggtttatga ttatgctcag taattttagt tgtgtttgag    60
tttgagtatc tttatggttt tgtgtcaccg tggttcttgt ttttgaccaa tatatctggt   120
tgtttatagt cgatttaatg aaatgataat cagaaattgg agtatcgaag ttctaatgat   180
ttttactatt tgtgcgctgg atgtggaaaa tcttctgttt cacgaatgcg tgtcttgtta   240
ttcttcttca gaacacaaca ggctaagcag ccttcaaaac aataaaggaa cttaattaac   300
aaaacctcga cggaaattta cctacagtttt ttgcctgtga aagataaaac cacaatttc   360
acgcccaatg ttctcaaagg attggggtct caagtgtgca gattggtgag aaaaatagat   420
acaacgagca ttttttgttc tgagaacatg aaatgtatt catcctttaa gtccgtgtgt   480
gtgtttatct ctgttcagac agtcagacct atgaattcat gaaacatgaa cagaaacatg   540
tccatcctct tgacttggtt ttaatttgat ggaaagcctg ctgatatcga gatgaacatt   600
attaaaagtc caattgtttc tacagaacta attgcaatcc tacagatcg caagcaccat   660
gtcatggctt actatattat ttgaagaaaa aaaatcatag gctcagtgct tttcgacaaa   720
tagagcattg ttgattgtta agtcaatcgt gttttgatgta taggtgtgtc tcataacatt   780
tgtaggcagg attattctag caaatttttca aagtacttta taatccgaat tttgcctgat   840
tgctttgttg ttccacagaa gatacacata attgtatttc catgaactcc taaatagttc   900
tcaaggtagg caaggtaaaa gcgataccat ttttgattga tatccctatc aaaaacttta   960
tttcttattt taagggaat tctttataac taatgattg c                         1001

SEQ ID NO: 20          moltype = DNA  length = 1001
FEATURE                Location/Qualifiers
source                 1..1001
                       mol_type = genomic DNA
                       organism = Glycine sp.
SEQUENCE: 20
gagggggga aatgaaaata aaaaaaaaa aattgtgtat tattgaattt ctctggaatc      60
ttcttctgtg tatggttttc cttccttgtg tttttcttcct aattcacttt cgagggttgt   120
acttgttcct ttcgtcttaa atccttggat ggttgatgat catgaagttc tctttaaagt   180
taaattatta tcatttgtg catgctctct ctctctcact tggtccacaa caattgaatt    240
```

```
gaatgtagta tcattattcg ggtctggttg gttgtaccat ttcactagta cttcttactt    300
tttcctgcat cctctctcga ttagaattaa aatatttctt tcttttctga agtttatgaa    360
tgattatact tgtgattttt gtgaccagtg tgttcatagc atattggtta aatatttatt    420
aaaaatcata atcaatataa tttcatgcat gtcaataaaa tttttaattc cttaatcaat    480
attttaaaaa tattagttag catttaacca aagaataaaa tatattaaaa gtataaaacg    540
gttaatcttg ctatgcgaca aaatgtccta attatagaat cgctcgagca catgctacga    600
gtgggtccac cagtgtggat gggtaattgt aattcacttc cctaatgaag acaaattaaa    660
tgcgaggaag aatgaatgta gaacgttgat agagaatgga ctgaacaaga ttgaagcata    720
tcatatagct atgcacctct tattggttgt atttctgtgc taattaaatt acaaacaagt    780
gaacacgtgt ttgagagtaa ctagtatgtg tgttcaagtt cgggaatgca tcctttagag    840
gtttcaattc gaaacattga atatataata ataataagaat tggatagacg caagattttt    900
atatgataac attaagtgaa aactgtatgt atgacaatat gatattcatt tagattcaaa    960
ttatcactgt actgctttat ttccccctgt atcattgcca a                        1001

SEQ ID NO: 21           moltype = DNA  length = 1000
FEATURE                 Location/Qualifiers
source                  1..1000
                        mol_type = genomic DNA
                        organism = Glycine sp.
SEQUENCE: 21
gccgcagcgc gacgtggagg aaatgcgcga tggtaggggt tgggtggttg gttgcgtggt     60
ggtcgggggct atggtggtga tggcacgcgc gatggtgaga gggtgatgtt tggttgtgga   120
tttttgacct cacggccccc ttcgatcgcc aacttagcga tgccttcaag gtccttgact   180
actccaccga ctatgtcgtc gtctccgagc tctgccacat cctctccgag cttctgtcaa   240
ttctaagttt ttaccaaatc tgagttgcga tttctgtgat gcatgttgtg tttttttctca   300
tctaattctt aacatctggt tcttatgttt tgtcgttcct ttcaatgatt gtgttttta    360
ttttgattt tggggctgta gttgaatggc attcgatgaa gatgaaaagg ttggggaaga    420
ggaataaaaa tttgtggcga ctttttatat tttgtgataa ttttaatct ataaattatt    480
tttaaaaaat tatattaaaa aataacatct tttaattttg tgataaaaat aacatattt    540
gacatttatt aaataattaa tatacaatta aaaatattta ataactagta aataatggga   600
gtagtaggag ggaggcagtg gattgagttg agagtcataa ataaacaggt ggcaagaaga   660
gaacagagat ggcatgcaag tatgcaatat ttgcaatcaa gtcaaaatga gagttggcca   720
accccaaagg ctgtagtagg taagcatggc ccattttagt ttttacactc acctctcatt   780
ttcacctcaa ccacttctgc ctccttgcac atccactcaa cggttcagat tcaatctgac   840
tccccaatct cagccgtgga ttcaaatgcc acctcaggca catgcaattg caattgcaaa   900
tggatgaaca taaccccacaa tctaatcttg ttacttaggg gcttttccgt cattaaatga   960
caccacccac ccccttttcc ctataaatgg caactcagtg                         1000

SEQ ID NO: 22           moltype = DNA  length = 1000
FEATURE                 Location/Qualifiers
source                  1..1000
                        mol_type = genomic DNA
                        organism = Glycine sp.
SEQUENCE: 22
ttcaatcaaa cggttcatgc ttaatcaagt tgggaacaac aaaaaagtca aaacaatgtt     60
tgtgggtttc ggtttcattt catcaagatg atctgtttat cttctttttt ttaaatttta   120
atttaaagtc tttgtaatttt gtatgtaaag atgtaaaatt atgattatta ggtggtgcat   180
gtgtcgcgtc atgggccaat gttatcctca gcttttaagt tggaagaggc ccaactcatg   240
tgtgatgtac ggctgtgatt gtgtaatttg caaaatcaaa aataacccccc gagtcatata   300
tgcatctttt tattttatct tattattaac atatatatat atatatatta atacctttta   360
aaattatgat gattatctct aaaacaaggt ctgaccataa tttttccaaa ttgcttttacc   420
tttattagtg attttatagc tgattttggt tcatctctta gaattgattt tggttcagct   480
cacggtaatt ccaaacatcc tatatattgc tactacttta ttttctctag accccccctat   540
atgtcttctc tctaagattt gtcctcttca tcgaagtata tgccaaggtt gggtttcttt   600
atccattcct gtcagtcctg tgcccgttat cacttgctat gatgattga aatccgggga   660
gagtgaggag tgggggttggt ttagggtggg tgggtgggtg gatgatgtct attgcttaaa   720
tatgggacca cttttcttcc tcaataatgc acatattcta gtgttgtcca tttaataatg   780
attcgtgatc atagccttgg gaaaaaaacg tacactattt tttatatttt gtgctaaaat   840
ttggacaagc ttgatcttat cagcttcggc ggggaatgcc acttcctcct agttacttcc   900
atggaatcct tcacggaaaa gacgtgggtg gcacttgtgg gatgggtaac tgagtagaaa   960
acattagtaa tttgacacgt cgtt gactcattct ataaatcgtt                    1000

SEQ ID NO: 23           moltype = DNA  length = 1000
FEATURE                 Location/Qualifiers
source                  1..1000
                        mol_type = genomic DNA
                        organism = Glycine sp.
SEQUENCE: 23
atcgtgcgga ttggttcatc agggggatgtc ctttcttgtg gttacattaa atgttggttt     60
cttgctcttg tgtcttcgtt tctaggtagc ttgttttttcg gacatagttt gaagtctcca   120
ccatcatctc gcaactttttg ttcccagaat tgggttcttg atcgacggtg gcaagacttc   180
ttttattatt ctgtgttttt gtgtttgtga gaaccctgc ccctgattac attttttgtta   240
agcgcagcga gttttaggac ttttgctgtt gcgttgttgg tttgtttttt aaattttaac   300
tttatatttg tgttcaattt tggcttggtt tgcttttaca atatcaactt tatactttgg   360
tgtcaaattt tggctttgga tattttaact aacggctgtt gttttttctt cccatgttat   420
gatttgtctg ccgggaagat gcaagaatct taaatctttt actaaagta aacgtgcttt    480
gacgacgggg aaccatattc gagtccttga tatttggtag tttgttttta tttttagttt   540
gaagaatata atttgttgac attttataat tgattgagaa ggtataattt gtattttata   600
ctatcgggat tttcttttaa ttgaatggag ttttttcaaa aatggatgat atataggaat   660
```

```
tgaatttgaa tttgtatcat agggcatagt gatgtgatta taattatatt ttccttggtgg  720
ttaatcgttt tcttaggatg aaaacatttt ttttttcttt gatgtgttgc attatcttaa  780
atgaatttct tgtttctaga taaatcttaa aatgaatttt aactgtggta catcaacatg  840
taattgacat aacgcgtaaa cttagaaagt ttgtaggttt caacaagata tgaagaatga  900
aacaaactag aataaggatt ctattttttat acaattaatt aaaattctcc cctagatctt  960
tcgaatagaa atgtttaata ttctctcctt ttctataaaa                        1000

SEQ ID NO: 24         moltype = DNA   length = 1000
FEATURE               Location/Qualifiers
source                1..1000
                      mol_type = genomic DNA
                      organism = Glycine sp.
SEQUENCE: 24
atcgtgcggg catcagggga tgtcgtttct tatggttacg ttaaatgttg gtttcttgct  60
attgtgtctt cgtttctagg tagcttgttt ttcggacata gtttgaagtc tccaccatca  120
tctcgcaact tttgttccca gaattgggtt cttgatcgac ggtggcaaga ctccttttat  180
tattctgtgt tttaatgtgt ttttgtgttt gtgagaaccc ctgccccctga ttacattttt  240
gtaagcgcag cgagttttag gacttttgct tgttgcgttg ttgatttgct ttttaaattg  300
taactttata tttgtgttca attttggctt ggtttgcttt taaaaatatt aacttttataa  360
tttggtatca aattttggct ttggatattt taactatcgg ctgttgcttt ttattcccat  420
gttatgattt gtctgcggga acatgcaaga atcttaaatc ttactaaaag taaacgtgct  480
ttgacgtttg aagaaaataa tttgttgacg ttttataatt gactgagaag gtataatttg  540
tgttttatac tatcgggatt ttctttcaat tgaatggaga ttttttttctt tcaaaaatgg  600
atgatatata agaagaattg attttggact tttatttatt actaattttg ataaaactac  660
ttttattctt taaagcatat gttaaaatta atttaatca tgtatttcag tgtaagcatg   720
ggaagagtaa gtttgatggt ttagtgaaaa ccaggctaga ataatataa tcccctttta   780
aattagacct ttttttttatt aaggccacca gaatctatac tccgccgatt acaaatgcca  840
aatccgatat ttaaccgttt tgaatttgta tcatagtgca tagtgatgtg attataatta   900
tatttcttg tgttaatc gttttcttag gatgaaaaca tttttttctt ttgatgtgtt      960
gcattatctt aaatgaattt ttttttttata gataaatctt                         1000

SEQ ID NO: 25         moltype = DNA   length = 1000
FEATURE               Location/Qualifiers
source                1..1000
                      mol_type = genomic DNA
                      organism = Glycine sp.
SEQUENCE: 25
aatgattata gaaaatagta tgctttctgg tgggagcagc actccttaag ccttagttac  60
tcatatggaa aatatcctag tttgtgagat ggtcaacttg ggtagttatg gtcccaaact  120
ctcaatttttc caagttgtgg cataaattct attgcacctt ttaacaagct ttgcttgttc   180
cagtgtgttt tattatgatt tgtgatttat acaaccttgc gtttgagtgc catttagtc    240
gtcttatccc ttactagttg aatttgtaac tgttatgtgt tatcagacaa aaattggggg    300
ttcttcactt attgacactc gtcatccact aatgttttgt atctctgacg tcttctgacg    360
gatatatgct ttcttttgta tgggcataca aaggcctctt gttcatgcta tattcctttt    420
ttgttctatg gtttgtggtg gaatgaattt tattcaactg gttggttgtt cttgaaacca    480
gagtgtactt cattcgtagc aatagcatct aagcggttaa tggtcatgct ttatgatact    540
agtagcactt gtgcagttta ttgctctttt ggccaatatg cacttgtgga aaaatgcttt    600
ttcagatatt gatccatact tcttaacatt tcgttttgga gtgtaggtag ttggaaagat    660
gggaaaaagg agagaaaatg acagatatgg taaataaatt atttaaatac attttttggtc  720
tatataattt agtatttttt aaattttgtt tttggaagaa aaaaattagt tcttgtaaaa    780
taggattgtt ttatttttttg tttttaaatt gttttagata agatttgttt tcctgcctaa   840
agtatttttt attgttttaaa ctttaaagag ttatctaaaa tacttaaagg ataaaaaaaa   900
tcaatacatt ttatatgaat taaaaaaaat acaggacaaa aataaaataa aaaattataa   960
ggatcaaaat tatatttaga cccaaataaa gtgataggaa                          1000

SEQ ID NO: 26         moltype = DNA   length = 1000
FEATURE               Location/Qualifiers
source                1..1000
                      mol_type = genomic DNA
                      organism = Glycine sp.
SEQUENCE: 26
atcgtgtggg ttggttcatc aggggatgtc gtttcttatg gttacgttaa atgttggttt   60
cttgctattg ggtcttcgtt tctaggtagc ttgttttttcg gacatagttt taagtctcca  120
ccatcactc gcaactttttg ttcccagaat tgggttcttg atcgacggtg gcaagactcc  180
ttttattatt ctgtgtttta atgtgttttt gtgtttgtga gaacccctg ccctgatta    240
cattttgta agcgcagcga gttttaggac ttttgctgtt gcgttgttga tttgcttttt   300
aaattttaac tttatatttg tgttcaattt tggcttggtt tgcttttaaa atattaactt   360
tgtaatttgg tatcaaattt tggctttgga tattttaact atcggctgtt gcttttttt   420
cccatgttat gatttgtctg cgggaagatg caagaatctt act aaaagtaaac            480
gtgctttgac gtttgaagaa aataatttgt tgacatttta taattgactg agaaggtata   540
atttgtgttt tatactatat atcgggatt ttctttcaat tgaatggaga ttttgttttt    600
tcaaaaatag atgatatata agaagaatgg aatttggact ttaattataa ctaatttga    660
taaaactact tttattcttt aaagcatatg ttaaaattaa ttttaatcat gtatttctgt   720
gtaagcatgg gaagagtaag tttgatggtt tagtgaaaac caggctaaga atattataat   780
ccccttttaa attagacctt ttttattaag gccaccagaa tctatactcc gctgattaca   840
aatgccaaat ccgatattta accgtttgaa atttgtatca gtgcatag tgatgtgatt    900
ataattatat tttcttggtg gttaatcgtt ttccttaggat gaaaacattt ttttttcttt  960
atgtgttgca ttatcttaaa tgaatttctt ttttatagat                         1000
```

| SEQ ID NO: 27 | moltype = DNA length = 1001 |
| --- | --- |
| FEATURE | Location/Qualifiers |
| source | 1..1001 |
| | mol_type = genomic DNA |
| | organism = Glycine sp. |

SEQUENCE: 27

```
aattttcctc cccttgtcta tgatcgagga agaaaatctg taatatatta tgcaaaaaat    60
aattaaggtc ttttccttta aatgggctgg ttcaatgaac cgagaccact gcaggttcat   120
ggggatggga ggattaagag gctatgtttt ttaatcttcc gatgttactg ttgttttttt   180
tttaatttca ataaggatat tatatatgta gtactatgca agtagcttag agttgggtag   240
aagggcatgt tcatggtgtt aattatgtta tgtatgcgtg tgagtgctgt tatgatggca   300
gtgacaatgc ttatgatatt catactcata aagctaggtt gttctttcta aataaataaa   360
tcatggccca tggcattat acactgttaa cactcgtatt agcataggcc cgaggataga   420
gacttgagga aacaagtttt aagtatccaa ctagtaacaa atgaataatc ttttaaatta   480
atgttatttt attttaagtg tggggttggca aacagattaa gcaaacaata tgtataattg   540
cggactaaaa taattgccga tagatactag tataggtggg ccaaaaagaa ggatgaagta   600
aacaaaagag gtccgttgat gtgggccaaa ccaatttcac atttgaaaga taagaaaaaa   660
ctttttgtaca cgcggaactt tgcactggat taggtgcagt gacgactaa ctgttttcat   720
cgaaaatgac cattagcaat aacctgcaag ggagaaaatg ccaaaatgaa atcacgttgg   780
atcagctggt gctgtcctag ctattattcc tatgtttctg cacggaaaac taccgtttgt   840
attcgaatga gcaatgagaa atgacaaaga gcctatctct agattctttt cttgttggtg   900
attcttgata agtttatttt gtaaatagcg ctgcaagagt atgaagccta gccaaatatg   960
atcatatata tattgtcaat attatgtttc tcaaaaaata g                      1001
```

| SEQ ID NO: 28 | moltype = DNA length = 1000 |
| --- | --- |
| FEATURE | Location/Qualifiers |
| source | 1..1000 |
| | mol_type = genomic DNA |
| | organism = Glycine sp. |

SEQUENCE: 28

```
gtaattcatt ccactgctct gtgctgggag ttttttgagc gttgccctta taatatgtct    60
aatatccata aatttccacg tctcctactc tgtgtgtgtt tctctcctct tcctcctatt   120
ttgttatttg tatgttcttt tgtaattttt tacatgatca actaaaaaca tgtactctct   180
gtttgtatgc cctaccaatg tgtctcttaa tatcaatatc aaaaagagag tgttcaagtt   240
aatgtttgga ttccaatgct tctctcgatg aactcgcgtg cattttttta aaatacttag   300
tttctcccaa ttccgaaaag ttcgagctgc aaatttggac agatgataaa tggtaggcac   360
gtgtggtgtt gtatacataa aaactgctat aactaaggtg ttaaatatta ctggtcatgt   420
aagatattgt tttctaagtt tatatttagt tgtaaataat agttacacta ttaaacaaag   480
taaacatttt aaaaaaaaca aacaaagtaa aacatttaa aaaaacaaac aaagtaaatc   540
atattttgtc acgtctttca gaaacaaagc tactgacatt ttttacttgc taattattgt   600
agtatcatgt tattgttggt tttcgtttac ttcccgtctc catcaccatt ggtattgaga   660
aaacaagttt ggacaatgtg cacatttcga gaactacgac aacttgatta agtactgtgt   720
caaatttcag ggagtaataa tttattattt ctcatttaat atttttttgtc                780
cgaaaaatag gaagtcttct ctaaaattta ttaatctatt gattggtaga ccattgtgct   840
gctatggccc ctaaataaaa tgtgccttct aaagtggtat gatggtttct ttttttcttgt  900
ttatgtaaga caaggatcgg acagatgtag attttacatt aacaataatc ctctgtctgt   960
ttgtagtgaa taaaaaaaaa aacaaatgaa caaataagat                         1000
```

| SEQ ID NO: 29 | moltype = DNA length = 1000 |
| --- | --- |
| FEATURE | Location/Qualifiers |
| source | 1..1000 |
| | mol_type = genomic DNA |
| | organism = Glycine sp. |

SEQUENCE: 29

```
ggcttgattt cgttgattag ggtttatgat tatgctcagt aattttagtt cttgtgtttg    60
agttcgagtt tctttatggt tttgtgttac cgtggttctt gttttgacc aatatatctg    120
gttgtttata gtcgatttaa tgaaatgata atcagaaatt ggagtattga agttctacac   180
atttttactt tttgtgtgct ggatgtgaaa atatattctat ttcacgaatg cttgtcttgt   240
tgttattctt cttccgaaca caacaggcta agcagcctto aaaacaaaaa aaacaactaa   300
attcacaaaa cctcgacgga aatttttccta cagttttgcc tgtgaaagag agagacacaa   360
ttttcacgcc caatgttctc aaaggattgg gttctcaagt gtgcagattg gtgagaaaaa   420
tagtacatcg aaatcgaaca ttttttttct gagaacatga aatgatattc atcctcaagg   480
ccgtgtatat gtttagctat gttcagacct atgaattcat gaaacatgtc acatcctctt   540
gttgattta attgatgaa agcttctgat atccagagga acattattaa aagtccaatt   600
gtttctacag aactaattgc aatcctacgt gacagcaagc acgatgtcat ggcttactaa   660
aatattaaga aaaaaaatca tagactcggt gcttttagac aaatagagca ttgttgattg   720
ttaagtcaat cctctcttt gggtataggg tggtctcata acatttgtag gcagggatta   780
ttctagcaat ttttcaaagt acttatatt ccgaattttg cctgattgct ttgttgttcc   840
acaaaagata caaataattg catatttgaa tagtttacaa ttgtaagtgt tagtaaaagt   900
atgaataatt gtatatttga attgtagtga gtatagttta gtggtaaaag tatgattctt   960
tcatggactc gactcctaaa tagttaaggt agtcaagaaa                        1000
```

| SEQ ID NO: 30 | moltype = DNA length = 1000 |
| --- | --- |
| FEATURE | Location/Qualifiers |
| source | 1..1000 |
| | mol_type = genomic DNA |
| | organism = Glycine sp. |

SEQUENCE: 30

```
gctgtttcaa tactgtggta gtgctataaa ttggcctact ttttgtttct tacagtctat    60
```

```
tagcctagca gccgttaggc ctcttttta aatgtaataa gttgaattcc tgaactcgtg    120
aagcttgccc cttattgaac cgtagtgttt ttggttgctt aataccatta agcattgagt    180
tgttttggat ttatttgcat ttaccgaatt ttatttggaa gatagtaagc gttttttcca    240
tgttcacaaa tatgccatga aaaaagcagt aaaatttcaa taaaccaaca tcatgataaa    300
acaaaagtat gcatcgtatg aaaaaaagtg ggtgatgaaa tgataagtct aattttggtc    360
gaatttggtc gttgttattt ttgcatgaac atctctttg tacaacctaa caactaattt    420
gctatttta atattttgt actgcttttg atttgcttgc tcttcacaat attatagtgt    480
tgcattagtt gttcaatttt ggttgtacaa ataatacaac ttttaagcag ttatcgtgaa    540
tgttagaaaa atcatgtgac ttatctctgt tattgggtga ttgcatttgt ttcgtgactt    600
gtctttaatc ggttacttat tttcaataat aaataacaat atagcattat tttgtgtcac    660
tttcttactt ttgattattg aaaagccgtg ctcctttgcc tgtctcttga gccatgtgat    720
tcgtcgtgaa ttgtgaggac gagatcatat ttgagaaaga aaatgtgagc tagacgtttc    780
tatagcttta ttacgtagcc cttgcaattc aattcagcag ggaacatatc aaaatgattt    840
gtattgaaaa aattgttcta cctacaaaaa tctactttat tatttgtact gaacgagaaa    900
gtgccacaat acttaattag ataagtagac attggagcta atctcaaaat tcttgcctgc    960
tttttctatc atatatctcc atatcactaa ttaattcatt                         1000

SEQ ID NO: 31          moltype = DNA  length = 2000
FEATURE                Location/Qualifiers
source                 1..2000
                       mol_type = genomic DNA
                       organism = Glycine sp.
SEQUENCE: 31
aaaactttca catgaatagc acgaagaatc acaatgaacg attgatcttc tttaaaatc     60
aaatattaat tgggaaataa aaaaataaaa aatggaagtt cacaatatag tgttcgtgtg    120
cttttcatga aaactgtttt tgtaacttc agcattttc atataattag gtcatgttgg    180
gtataattag ctataaaatt agttaaaaat ttaaaaatta gttggtaact taaagttaaa    240
aagtaactta ttaaattaaa aatattttaa taaaattaat tgttaaaata attgaaaagt    300
ataaaataac aaaaaataat aaatcaatta atttaaataa gataactagg aaaataaata    360
aaagattaaa aaaaactaaa aaactaaaaa actaaagttt taaataatgt ttaaaaatag    420
ttaaaaatta ttaaaaactt atttataaaa cagttaaatt ataaacaaac ttttcgctta    480
tgaaaaataa aagcttacct aactttagta gacaacttgt ccaacaatta gttgatacct    540
attgcccta agttttcttt aatatcaatt attggttttg tcaacaagct atctttaat    600
cttaatttat tggtaaaaaa tccgtcgcct tcaagttaca tcattaaca catctgctca    660
ttagaaaaat aaaattcttc ctaaacgatt agtagaaaaa atcattttaa taatgaataa    720
gaaagaaata ttaggaaaaa ataacttcat ttaaaaaaaa catttggatt atatttact    780
ttaaaatatc taaatatttt taaatgacta atttatata cactgtaact aaaagtatac    840
aagttattat gttatgtatc ataaagaaat acttaaaaaa tctactgaag aaatatcttac   900
aaagtaaaaa taaaataaga aataagttag tggaataatt atgattttat ttgaaaattg    960
aaaaaataat tattaaagaa tttagtggag taagaaagct ttccgattat tctttttttc    1020
cataataaaa aaatctagca tgacagcttt tccatagatt ttaataatgt aaaatactag    1080
tagcagccga ccgttcaggt aatggaccct ataaaatttc gaacgctcca ctccacttgc    1140
aacgagtgcg ggccccaatt taataacgcc gtcgtaacag ataaagtcca acgtgaagcg    1200
gtgaaggtgc atctctgact ccgtcaagat tacgaaaccg ctaattacga aggactcccc    1260
gaaaatgcat ccaataccga aatatcatgt gtgataagca ccaagtgaca ccatacatga    1320
gcacgcgtca caatatgatt ggagaacagt tccaccacat atgctataaa ttgccccccac   1380
accctcgtc catcttcgca gttcaattcc aatcaaatta gttcattctc tttgcgcagt    1440
tccctacctc tccattcaag gttcgtaaat tttttctgtt tttctttttt ctttttttcg    1500
ttattgtttg ttcttcatca gcatgatgtt gatttgattg tgttctacat agtttcatcg    1560
aatcttaatt ttcataatca gaatcagctt ttattaatgc aagaactttt taatggatg    1620
attttacaat cgtatattag gtctaattag agtttttttt cataaaaaat ttcagatccg    1680
tttacaacaa gccttaattt agattctgta gtcgtagatt aggttttttt tttcattta    1740
ttacttcaga tccgttaaag aacagcctta tttgttgata cttcagtcgt ttttcaagaa    1800
attgtcagac cagttgaaaa aagcctgatt cgttgattct gtatagtttt tcaagagata    1860
ttgctcagat ctgttagcaa ctgccttatc tgttgattct atggccatag attaggggtt    1920
tttttctctc catgaaattg cttcttaaaa ctacgtgatg gattttgatt ctgatttatc    1980
tgtgattgtt gattctacag                                               2000
```

GLYCINE REGULATORY ELEMENTS AND USES THEREOF

RELATED APPLICATIONS

This application is a division of U.S. application Ser. No. 17/772,797 filed Apr. 28, 2022, which is a 371 of International Application No. PCT/US2020/061749, filed Nov. 23, 2020, which claims priority to U.S. provisional Application No. 62/939,762, filed Nov. 25, 2019, the contents of which are incorporated by reference in their entirety herein.

FIELD OF THE INVENTION

The present invention relates to regulatory elements, e.g., promoters and terminators, which are useful for expression cassettes in plants, such as soybean.

SEQUENCE LISTING

This application is accompanied by a sequence listing entitled 82000_ST25.txt, created Nov. 16, 2020, which is approximately 54 kb in size. This sequence listing is incorporated herein by reference in its entirety. This sequence listing is submitted herewith via EFS-Web, and is in compliance with 37 C.F.R. § 1.824 (a) (2)-(6) and (b).

BACKGROUND

Genetically modified plants are an important source of desirable traits, such as insect resistance and herbicide tolerance. In general, to create such traits, one or more nucleic acids are introduced into a plant containing expression cassettes that express one or more coding sequences for one or more traits. Such expression cassettes generally contain a promoter and terminator sequence to control expression of each coding sequence. For certain traits, such as insect resistance and herbicide tolerance, it may be desirable to use promoters and terminators with medium to high constitutive expression. The choices for such promoters and terminators remain limited. There remains a need for additional sequences for promoters and terminators that drive gene expression for robust protein production, ideally in all or most soybean tissues.

SUMMARY

Provided herein are regulatory elements, such as promoters and terminators, obtained or derived from *Glycine* species, e.g., *Glycine argyrea, Glycine canescens, Glycine clandestine, Glycine max* and *Glycine tomentella*. Such regulatory elements are useful for constructing expression cassettes for expression of a coding sequence of interest, such as expression of a coding sequence for a trait of interest in a plant. As described herein, several promoter and terminator sequences were tested and shown to have improved levels of expression in leaf, root, seed pod, and/or embryo compared to a control promoter or terminator. Accordingly, aspects of the disclosure relate to such regulatory elements and their use in expression cassettes, vectors, and transgenic plant and plant cells.

In some embodiments, the disclosure provides an expression cassette comprising a nucleotide sequence having at least 90% identity (e.g., at least 91%, at least 92%, at least 93%, at least 94%, at least 95%, at least 96%, at least 97%, at least 98%, at least 99%, or 100% identity) with one or more of SEQ ID NOs: 1-5, 8-29, or 31, wherein the nucleotide sequence is operably linked to a heterologous nucleotide sequence. In some embodiments, the disclosure provides an expression cassette comprising a nucleotide sequence comprising one or more of SEQ ID NOs: 1-5, 8-29, or 31, or a biologically active fragment thereof, wherein the nucleotide sequence is operably linked to a heterologous nucleotide sequence. In some embodiments, the disclosure provides an expression cassette comprising a first nucleotide sequence having at least 90% identity (e.g., at least 91%, at least 92%, at least 93%, at least 94%, at least 95%, at least 96%, at least 97%, at least 98%, at least 99%, or 100% identity) with one or more of SEQ ID NOs: 1-5 and a second nucleotide sequence having at least 90% identity (e.g., at least 91%, at least 92%, at least 93%, at least 94%, at least 95%, at least 96%, at least 97%, at least 98%, at least 99%, or 100% identity) with one or more of SEQ ID NOs: 8-29, wherein the first and/or second nucleotide sequence are operably linked to a heterologous nucleotide sequence.

In some embodiments, the heterologous nucleotide sequence is a nucleic acid of interest that encodes an RNA or protein of interest. In some embodiments, the RNA or protein of interest is capable of conferring upon a plant a desired characteristic such as antibiotic resistance, virus resistance, insect resistance, disease resistance, resistance to other pests, herbicide tolerance, improved nutritional value, improved performance in an industrial process or altered reproductive capability. In some embodiments, the heterologous nucleotide sequence encodes a selectable marker. In some embodiments, the expression cassette further comprises a selectable marker.

In some embodiments, the disclosure provides a vector comprising the expression cassette of any of the above-mentioned embodiments. In some embodiments, the vector is a plasmid, virus, or *Agrobacterium*.

In some embodiments, the disclosure provides a plant cell comprising the expression cassette or vector of any of the above-mentioned embodiments. In some embodiments, the plant cell is a dicot cell. In some embodiments, the plant cell is a *Glycine max* cell. In some embodiments, the disclosure provides a transgenic plant comprising the plant cell. In some embodiments, the plant is a dicot. In some embodiments, the plant is a *Glycine max* plant. In some embodiments, the disclosure provides a seed from the transgenic plant.

In some embodiments, the disclosure provides a method, comprising introducing the expression cassette or vector of any of the above-mentioned embodiments into a plant or plant cell. In some embodiments, the method further comprises placing the plant or plant cell under conditions whereby an RNA or protein of interest and/or a selectable marker is expressed from the expression cassette or vector. In some embodiments, the method further comprises crossing the plant to a second plant or self-crossing the plant to produce a progeny plant.

In some embodiments, the disclosure provides a transgenic plant produced by the method of any of the above-mentioned embodiments, or a plant part thereof. In some embodiments, the plant is a dicot. In some embodiments, the plant is a *Glycine max* plant.

24276=prGmSAMS, positive control. The labels A010A, A021A, A027A, etc. each represent a different event.

Figure 2:
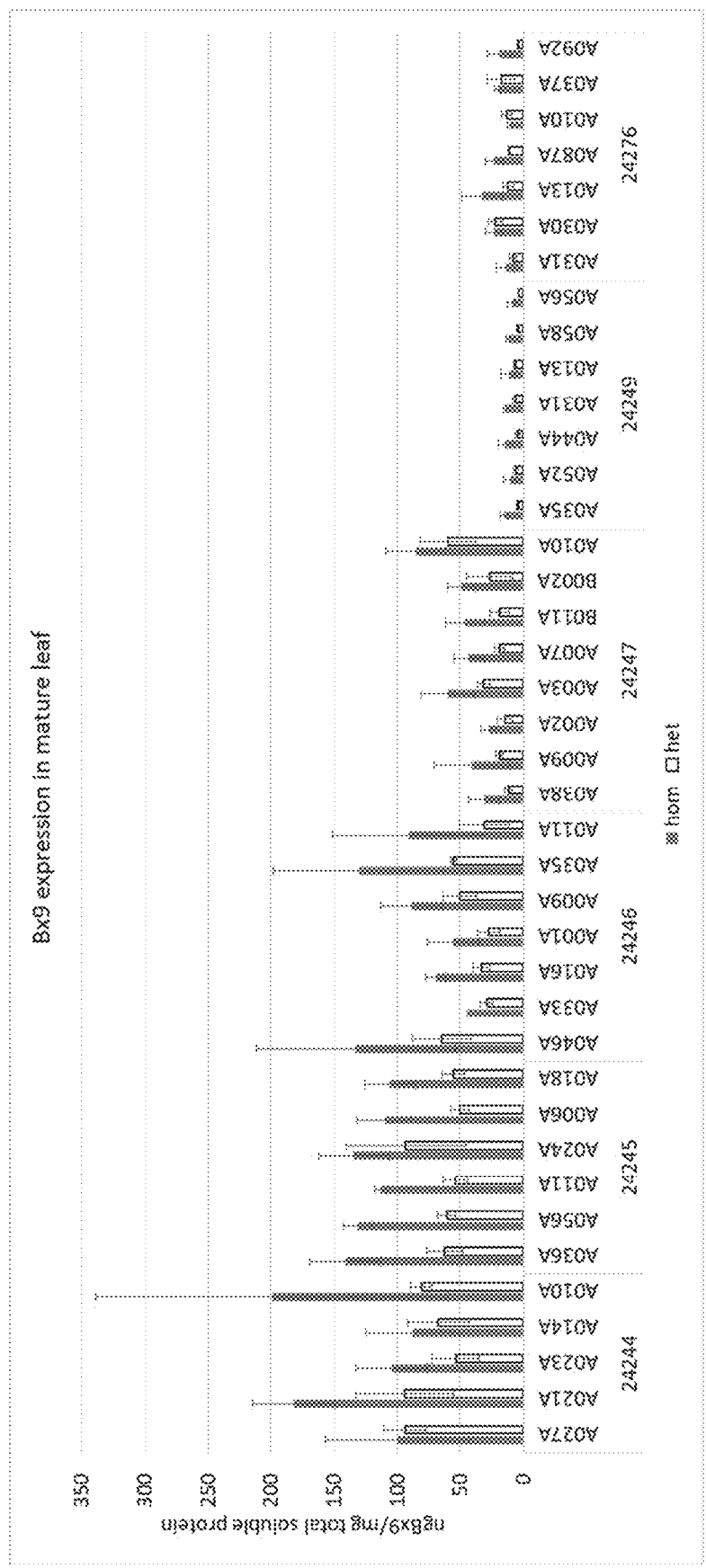

FIG. 2 is a graph showing Bx9 expression in T1 soybean mature leaf at reproductive stage. Hom=homozygous, Het=heterozygous. 24244=prGaUbi599400; 24245=prGcUbiPI339656; 24246=prGtUbiPI505267; 24247=prGaEF1aPI599400; 24249=prGaSAMSPI599400, negative control; 24276=prGmSAMS, positive control. The labels A027A, A021A, A023A, etc. each represent a different event.

Figure 3:
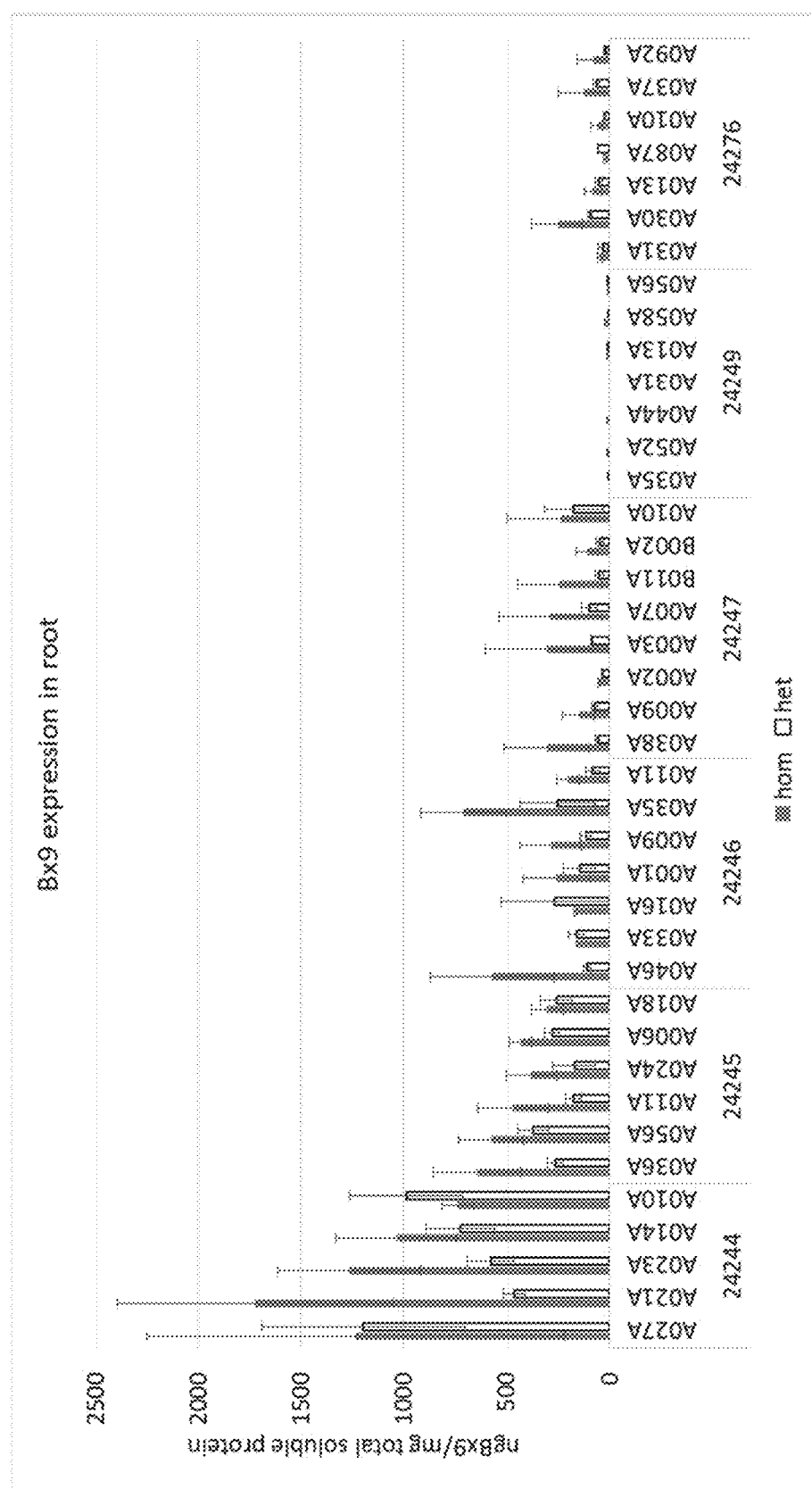

FIG. 3 is a graph showing Bx9 expression in T1 soybean root at the reproductive stage. Hom=homozygous, Het=heterozygous. 24244=prGaUbi599400; 24245=prGcUbiPI339656; 24246=prGtUbiPI505267; 24247=prGaEF1aPI599400; 24249=prGaSAMSPI599400, negative control; 24276=prGmSAMS, positive control. The labels A027A, A021A, A023A, etc. each represent a different event.

Figure 4:
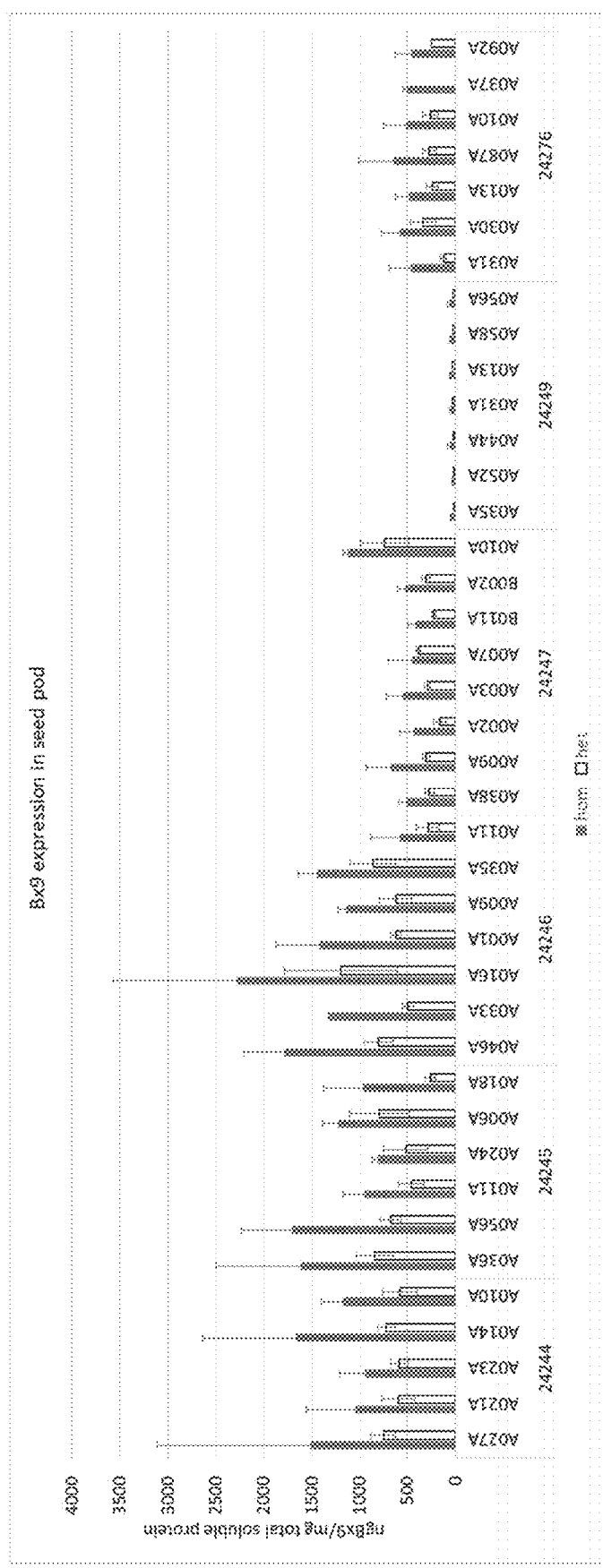

FIG. 4 is a graph showing Bx9 expression in T1 soybean seed pod. Hom=homozygous, Het=heterozygous. 24244=prGaUbi599400; 24245=prGcUbiPI339656; 24246=prGtUbiPI505267; 24247=prGaEF1aPI599400; 24249=prGaSAMSPI599400, negative control; 24276=prGmSAMS, positive control. The labels A027A, A021A, A023A, etc. each represent a different event.

Figure 5:
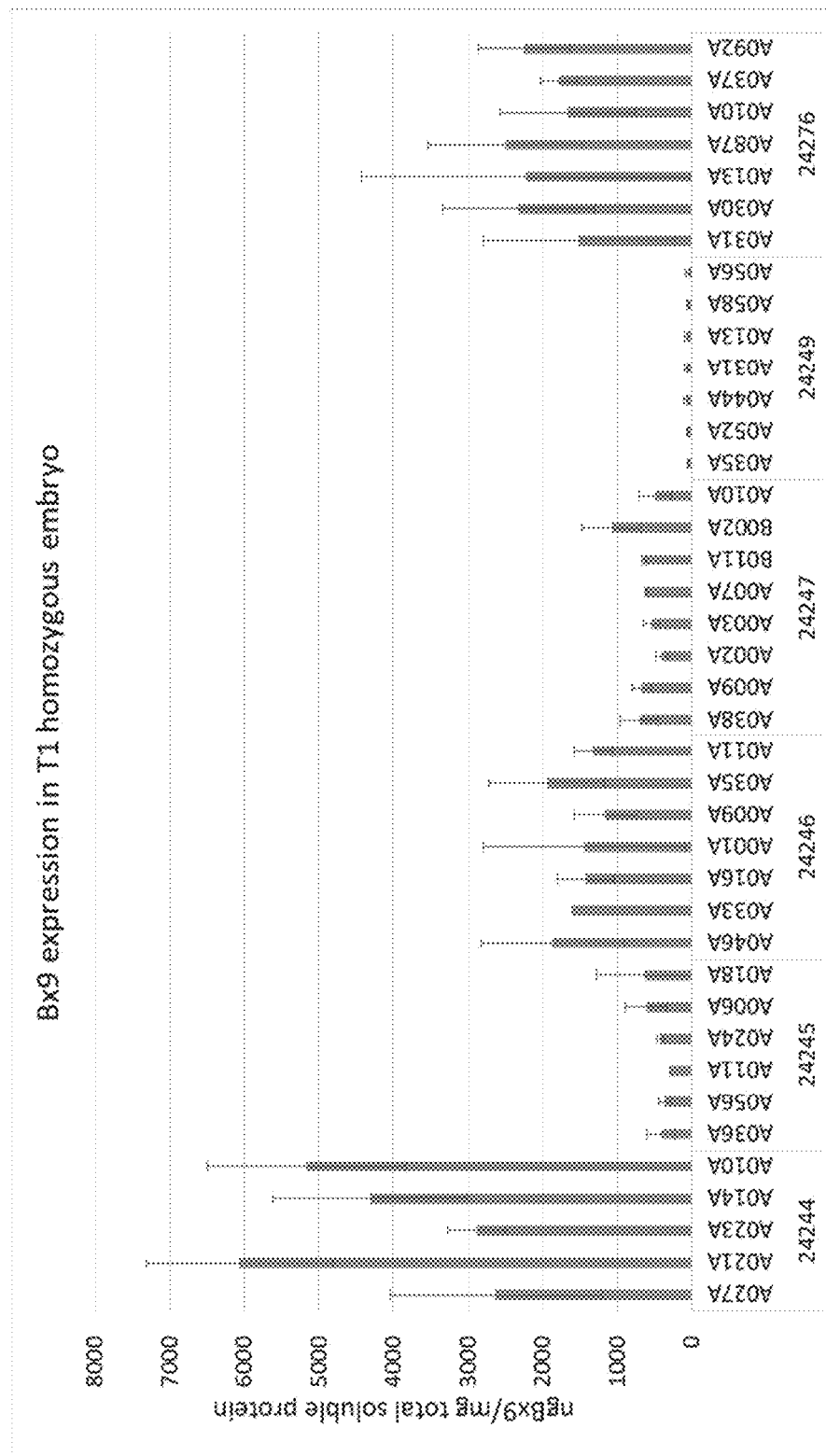

FIG. 5 is a graph showing Bx9 expression in T1 soybean homozygous embryo. 24244=prGaUbi599400; 24245=prGcUbiPI339656; 24246=prGtUbiPI505267; 24247=prGaEF1aPI599400; 24249=prGaSAMSPI599400, negative control; 24276=prGmSAMS, positive control. The labels A027A, A021A, A023A, etc. each represent a different event.

Figure 6:
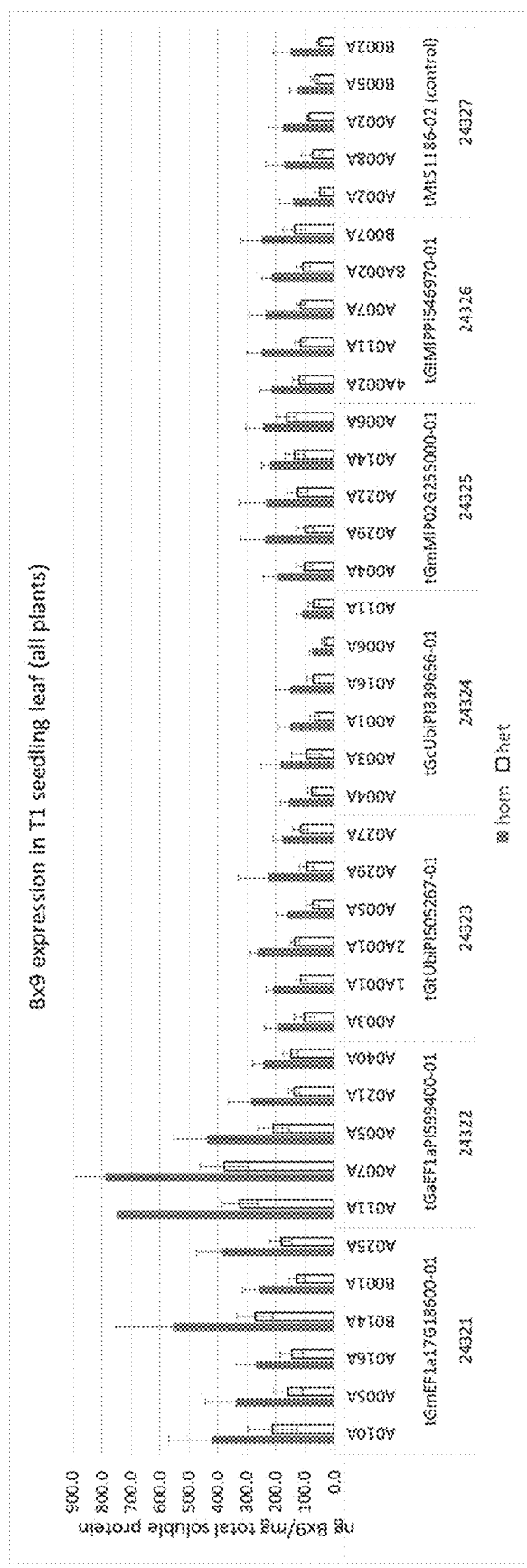

FIG. 6 is a graph showing Bx9 expression in T1 soybean seedling leaf. Hom=homozygous, Het=heterozygous. The labels A010A, A005A, A016A, etc. each represent a different event.

Figure 7:
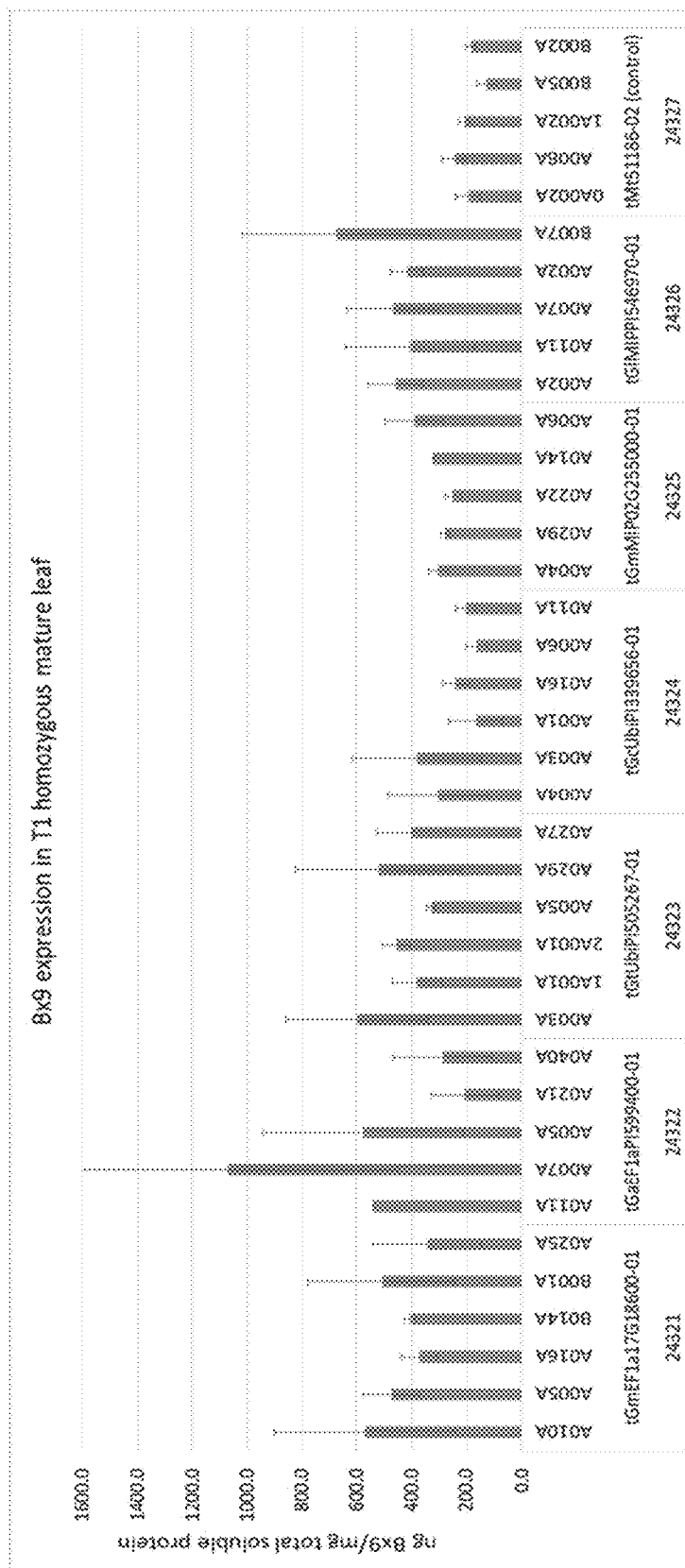

FIG. 7 is a graph showing Bx9 expression in T1 soybean homozygous mature leaf at reproductive stage. The labels A010A, A005A, A016A, etc. each represent a different event.

Figure 8:
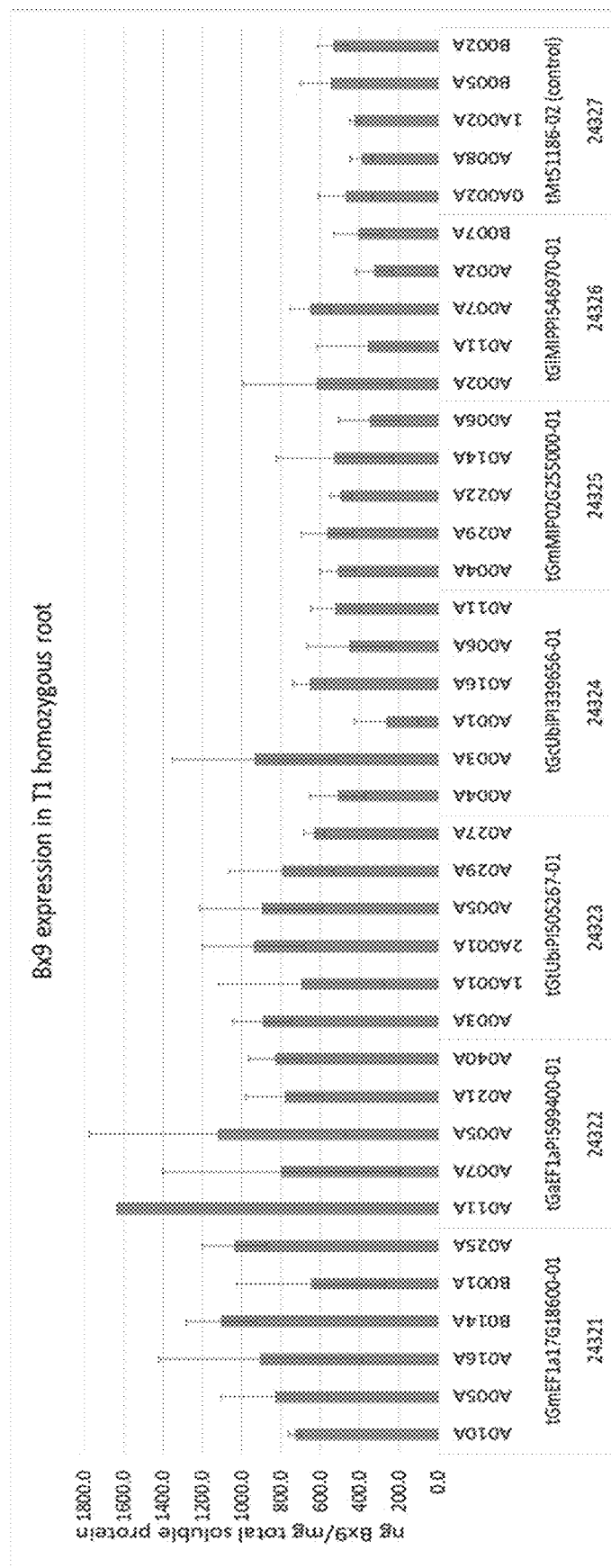

FIG. 8 is a graph showing Bx9 expression in T1 soybean homozygous root at the reproductive stage. The labels A010A, A005A, A016A, etc. each represent a different event.

Figure 9:
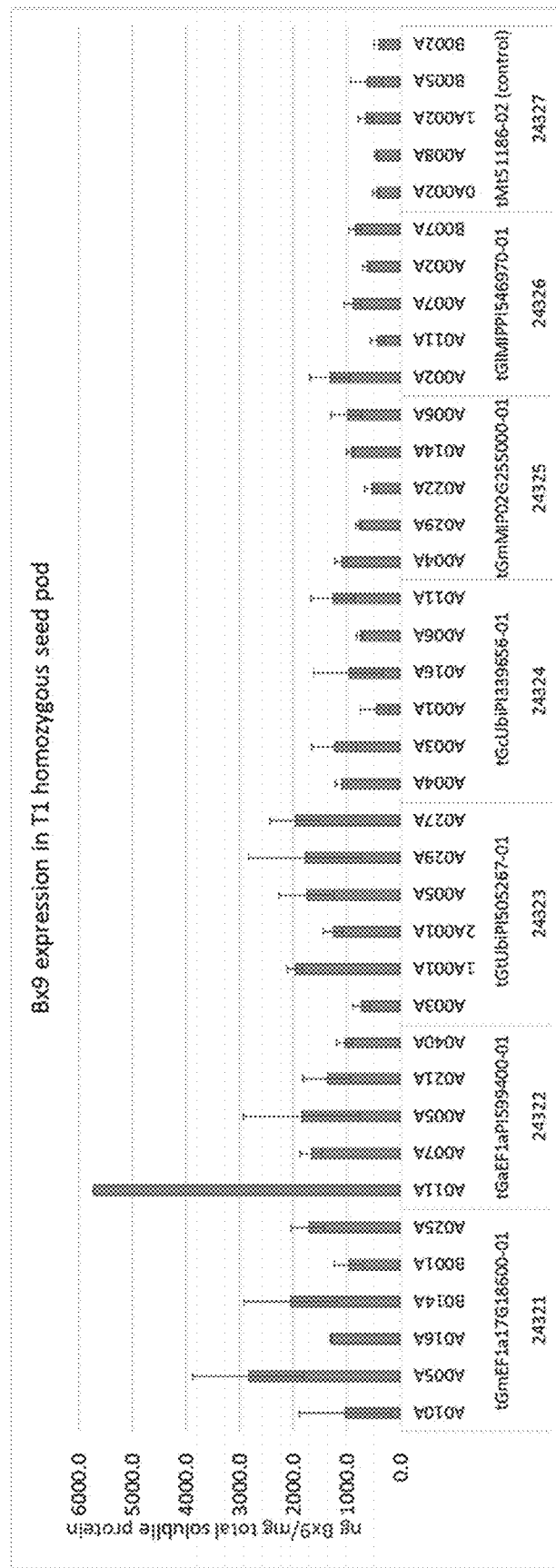

FIG. 9 is a graph showing Bx9 expression in T1 soybean homozygous seed pod. The labels A010A, A005A, A016A, etc. each represent a different event.

Figure 10:
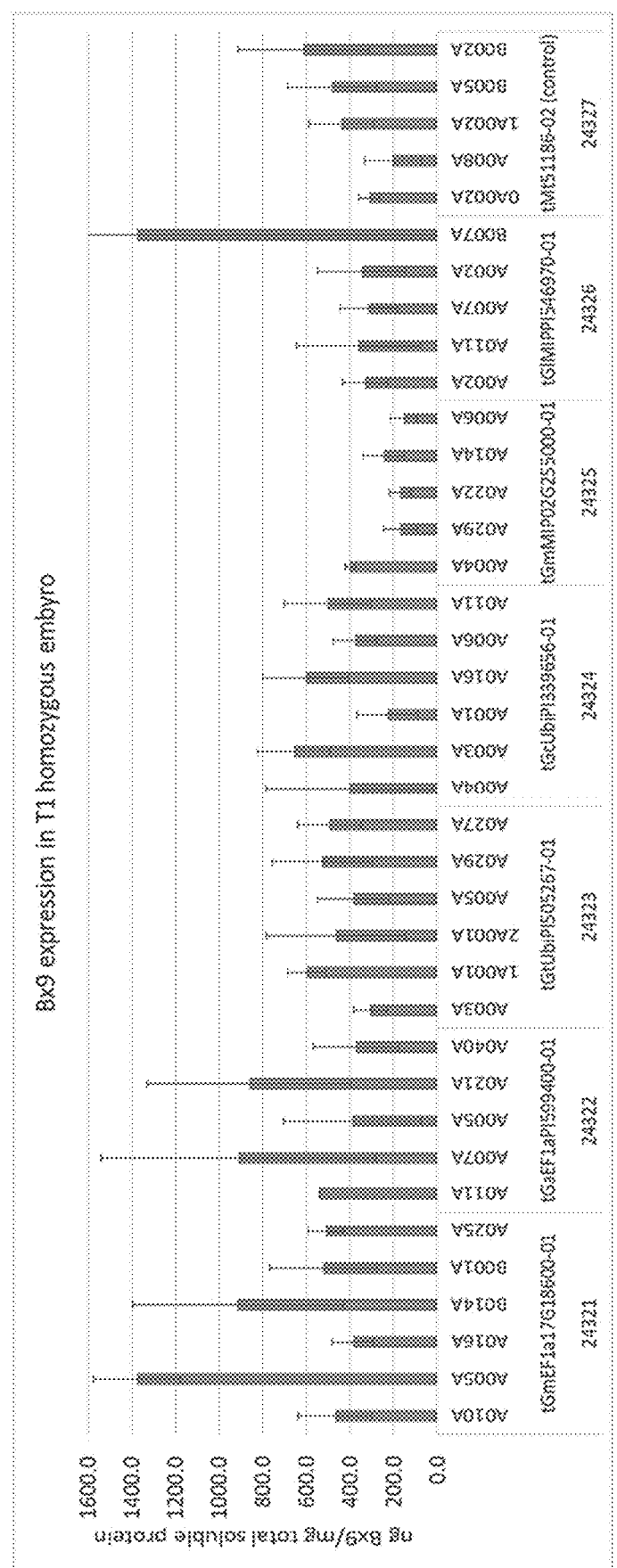

FIG. 10 is a graph showing Bx9 expression in T1 soybean homozygous embryo. The labels A010A, A005A, A016A, etc. each represent a different event.

BRIEF DESCRIPTION OF THE SEQUENCES IN THE SEQUENCE LISTING

SEQ ID NO: 1 is promoter prGaUbiPI599400.
SEQ ID NO: 2 is promoter prGcUbiPI339656.
SEQ ID NO: 3 is promoter prGtUbiPI505267.
SEQ ID NO: 4 is promoter prGaEF1aPI599400.
SEQ ID NO: 5 is promoter prGmEF1aGlyma17G186600.
SEQ ID NO: 6 is promoter prGaSAMS599400.
SEQ ID NO: 7 is promoter prGmSAMS.
SEQ ID NO: 8 is terminator tGmEF1a17G18600.
SEQ ID NO: 9 is terminator tGtUbiPI505267.
SEQ ID NO: 10 is terminator tGaEF1aPI599400.
SEQ ID NO: 11 is terminator tGmMIP02G255000.
SEQ ID NO: 12 is terminator tGtMIPPI505267.
SEQ ID NO: 13 is terminator tGlMIPPI546970.
SEQ ID NO: 14 is terminator tGcUbiPI339656.
SEQ ID NO: 15 is terminator tGtEF1aPI441001.
SEQ ID NO: 16 is terminator tGaUbiPI599400.
SEQ ID NO: 17 is terminator tGcUbiPI595799.
SEQ ID NO: 18 is terminator tGcSAMSPI339656.
SEQ ID NO: 19 is terminator tGmRBPGlyma11G117300.
SEQ ID NO: 20 is terminator tGmMIPGlyma19G186100.
SEQ ID NO: 21 is terminator tGaSAMSPI599400.
SEQ ID NO: 22 is terminator tGaMIPPI505151.
SEQ ID NO: 23 is terminator tGtEF-02PI441001.
SEQ ID NO: 24 is terminator tGaEF-02PI599400.
SEQ ID NO: 25 is terminator tGaADF3PI599400.
SEQ ID NO: 26 is terminator tGcEF-02PI483193.
SEQ ID NO: 27 is terminator tGmPOXGlyma07G260300.
SEQ ID NO: 28 is terminator tGtSAMsPI505267.
SEQ ID NO: 29 is terminator tGaRBPPI599400.
SEQ ID NO: 30 is terminator tMt51186.
SEQ ID NO: 31 is promoter prGaUbiPI599400-02.

Definitions

Although the following terms are believed to be well understood by one of ordinary skill in the art, the following definitions are set forth to facilitate understanding of the presently disclosed subject matter.

All technical and scientific terms used herein, unless otherwise defined below, are intended to have the same meaning as commonly understood by one of ordinary skill in the art. References to techniques employed herein are intended to refer to the techniques as commonly understood in the art, including variations on those techniques or substitutions of equivalent techniques that would be apparent to one of skill in the art.

All patents, patent publications, non-patent publications referenced herein are incorporated by reference in their entireties for the teachings relevant to the sentence or paragraph in which the reference is presented. In case of a conflict in terminology, the present specification is controlling.

As used herein, the terms "a" or "an" or "the" may refer to one or more than one, unless the context clearly and unequivocally indicates otherwise. For example, "an" endogenous nucleic acid can mean one endogenous nucleic acid or a plurality of endogenous nucleic acids.

The term "about" is used herein to mean approximately, roughly, around, or in the region of. When the term "about" is used in conjunction with a numerical range, it modifies that range by extending the boundaries above and below the numerical values set forth. In general, the term "about" is used herein to modify a numerical value above and below the stated value by a variance of 20 percent, preferably 10 percent up or down (higher or lower). With regard to a temperature the term "about" means±1° C., preferably ±0.5° C. Where the term "about" is used in the context of this invention (e.g., in combinations with temperature or molecular weight values) the exact value (i.e., without "about") is preferred.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above.

As used herein, a "biologically active fragment" refers to a fragment of a reference sequence that has activity that is substantially equivalent to (e.g., at least 90% equivalent to) or greater than the activity of a reference sequence. For example, a biologically active fragment of a reference promoter would be a fragment that is capable of driving expression of a coding sequence at a substantially equivalent or higher level compared to the reference promoter.

A "coding sequence" is a nucleic acid sequence that is transcribed into RNA such as mRNA, rRNA, tRNA, snRNA, sense RNA or antisense RNA. In some embodiments, the RNA is then translated in an organism to produce a protein.

As used herein, the terms "elite" and/or "elite line" refer to any line that is substantially homozygous and has resulted from breeding and selection for desirable agronomic performance.

An "enhancer" is a nucleotide sequence that can stimulate promoter activity and can be an innate element of the promoter or a heterologous element inserted to enhance the level or tissue specificity of a promoter. The primary sequence can be present on either strand of a double-stranded DNA molecule, and is capable of functioning even when placed either upstream or downstream from the promoter.

The term "expression" when used with reference to a polynucleotide, such as a gene, ORF or portion thereof, or a transgene in plants, refers to the process of converting genetic information encoded in a gene into RNA (e.g., mRNA, rRNA, tRNA, or snRNA) through "transcription" of the gene (i.e., via the enzymatic action of an RNA polymerase), and into protein where applicable (e.g., if a gene encodes a protein), through "translation" of mRNA. Gene expression can be regulated at many stages in the process. For example, in the case of antisense or dsRNA constructs, respectively, expression may refer to the transcription of the antisense RNA only or the dsRNA only. In embodiments, "expression" refers to the transcription and stable accumulation of sense (mRNA) or functional RNA. "Expression" may also refer to the production of protein.

"Expression cassette" as used herein means a nucleic acid molecule capable of directing expression of a particular polynucleotide or polynucleotides in an appropriate host cell, comprising a promoter operably linked to the polynucleotide or polynucleotides of interest which is/are operably linked to termination signals. It also typically comprises polynucleotides required for proper translation of the polynucleotide or polynucleotides of interest. The expression cassette may also comprise polynucleotides not necessary in the direct expression of a polynucleotide of interest but which are present due to convenient restriction sites for removal of the cassette from an expression vector. The expression cassette comprising the polynucleotide(s) of interest may be chimeric, meaning that at least one of its components is heterologous with respect to at least one of its other components. The expression cassette may also be one that is naturally occurring but has been obtained in a recombinant form useful for heterologous expression. Typically, however, the expression cassette is heterologous with respect to the host, i.e. the particular polynucleotide of the expression cassette does not occur naturally in the host cell and must have been introduced into the host cell or an ancestor of the host cell by a transformation process known in the art. The expression of the polynucleotide(s) in the expression cassette is generally under the control of a promoter. In the case of a multicellular organism, such as a plant, the promoter can also be specific or preferential to a particular tissue, or organ, or stage of development. An expression cassette, or fragment thereof, can also be referred to as "inserted polynucleotide" or "insertion polynucleotide" when transformed into a plant.

As used herein, the term "genome editing agent" refers to an agent that is capable of inducing a deletion, insertion, indel, or other modification in the genome of a cell, e.g., by creating a single or double-stranded break in the genome. Examples of genome editing agents include CRISPR/Cas agents (e.g., Cas proteins and guide RNAs), transcription activator-like effector nucleases (TALENs), DNA-guided nucleases, meganucleases, recombinases, and zinc finger nucleases. Cas proteins include Cas9, Cpf1 (also known as Cas12a), C2c1, C2c2, and C2c3, and functional variants thereof. Example Cas9 and Cpf1 proteins include Streptococcus pyogenes Cas9 (SpCas9), Streptococcus thermophilus Cas9 (StCas9), Streptococcus pasteurianus (SpaCas9), Campylobacter jejuni Cas9 (CjCas9), Staphylococcus aureus (SaCas9), Francisella novicida Cas9 (FnCas9), Neisseria cinerea Cas9 (NcCas9), Neisseria meningitis Cas9 (NmCas9), Francisella novicida Cpf1 (FnCpf1), Acidaminococcus sp. Cpf1 (AsCpf1), or Lachnospiraceae bacterium ND2006 Cpf1 (LbCpf1). A "variant" of a Cas protein refers to a protein or polypeptide derivative of a wild type Cas protein, e.g., a protein having one or more point mutations, insertions, deletions, truncations, a fusion protein, or a combination thereof. In certain embodiments, the Cas variant is a functional variant which substantially retains the nuclease activity of or has better nuclease activity than the wild type Cas protein. Example guide RNAs include single guide RNAs and dual guide RNAs.

A "heterologous" nucleic acid sequence is a nucleic acid sequence not naturally associated with a host cell into which it is introduced, including non-naturally occurring multiple copies of a naturally occurring nucleic acid sequence. A nucleic acid sequence can also be heterologous to other nucleic acid sequences with which it may be associated, for example in a nucleic acid construct, such as e.g., an expression vector. As one nonlimiting example, a promoter may be present in a nucleic acid construct in combination with one or more regulatory element and/or coding sequences that do not naturally occur in association with that particular promoter, i.e., they are heterologous to the promoter.

An "isolated" nucleic acid molecule or nucleotide sequence or an "isolated" polypeptide is a nucleic acid molecule, nucleotide sequence or polypeptide that, by the hand of man, exists apart from its native environment and/or has a function that is different, modified, modulated and/or altered as compared to its function in its native environment and is therefore not a product of nature. An isolated nucleic acid molecule or isolated polypeptide may exist in a purified form or may exist in a non-native environment such as, for example, a recombinant host cell. Thus, for example, with respect to polynucleotides, the term isolated means that it is separated from the chromosome and/or cell in which it naturally occurs. A polynucleotide is also isolated if it is separated from the chromosome and/or cell in which it naturally occurs and is then inserted into a genetic context, a chromosome, a chromosome location, and/or a cell in which it does not naturally occur. The recombinant nucleic acid molecules and nucleotide sequences of the invention can be considered to be "isolated" as defined above.

Thus, an "isolated nucleic acid molecule" or "isolated nucleotide sequence" is a nucleic acid molecule or nucleotide sequence that is not immediately contiguous with nucleotide sequences with which it is immediately contiguous (one on the 5' end and one on the 3' end) in the naturally occurring genome of the organism from which it is derived. Accordingly, in one embodiment, an isolated nucleic acid includes some or all of the 5' non-coding (e.g., promoter) sequences that are immediately contiguous to a translation start site or transcription start site of a coding sequence. The term therefore includes, for example, a recombinant nucleic acid that is incorporated into a vector, into an autonomously replicating plasmid or virus, or into the genomic DNA of a prokaryote or eukaryote, or which exists as a separate molecule (e.g., a cDNA or a genomic DNA fragment produced by PCR or restriction endonuclease treatment), independent of other sequences. It also includes a recombinant nucleic acid that is part of a hybrid nucleic acid molecule encoding an additional polypeptide or peptide sequence. An "isolated nucleic acid molecule" or "isolated nucleotide sequence" can also include a nucleotide sequence derived from and inserted into the same natural, original cell type, but which is present in a non-natural state, e.g., present in a different copy number, and/or under the control of different regulatory sequences than that found in the native state of the nucleic acid molecule.

The term "isolated" can further refer to a nucleic acid molecule, nucleotide sequence, polypeptide, peptide or fragment that is substantially free of cellular material, viral material, and/or culture medium (e.g., when produced by recombinant DNA techniques), or chemical precursors or other chemicals (e.g., when chemically synthesized). Moreover, an "isolated fragment" is a fragment of a nucleic acid molecule, nucleotide sequence or polypeptide that is not naturally occurring as a fragment and would not be found as such in the natural state. "Isolated" does not necessarily mean that the preparation is technically pure (homogeneous), but it is sufficiently pure to provide the polypeptide or nucleic acid in a form in which it can be used for the intended purpose.

In representative embodiments of the invention, an "isolated" nucleic acid molecule, nucleotide sequence, and/or polypeptide is at least about 5%, 10%, 15%, 20%, 25%, 30%, 40%, 50%, 60%, 70%, 75%, 80%, 85%, 90%, 95%, 97%, 98%, 99% pure (w/w) or more. In other embodiments, an "isolated" nucleic acid, nucleotide sequence, and/or polypeptide indicates that at least about a 5-fold, 10-fold, 25-fold, 100-fold, 1000-fold, 10,000-fold, 100,000-fold or more enrichment of the nucleic acid (w/w) is achieved as compared with the starting material.

The term "introducing" or "introduce" in the context of a plant cell, plant and/or plant part means contacting a nucleic acid molecule with the plant, plant part, and/or plant cell in such a manner that the nucleic acid molecule gains access to the interior of the plant cell and/or a cell of the plant and/or plant part. Where more than one nucleic acid molecule is to be introduced these nucleic acid molecules can be assembled as part of a single polynucleotide or nucleic acid construct, or as separate polynucleotide or nucleic acid constructs, and can be located on the same or different nucleic acid constructs. Accordingly, these polynucleotides can be introduced into plant cells in a single transformation event, in separate transformation events, or, e.g., as part of a breeding protocol. Thus, the term "transformation" as used herein refers to the introduction of a heterologous nucleic acid into a cell. Transformation of a cell may be stable or transient. Thus, a transgenic plant cell, plant and/or plant part of the invention can be stably transformed or transiently transformed.

The terms "percent sequence identity" or "percent identity" are used interchangeably herein and is used herein refers to the percentage of identical nucleotides or amino acids in a linear polynucleotide or amino acid sequence of a reference ("query") sequence (or its complementary strand) as compared to a test ("subject") sequence (or its complementary strand) when the two sequences are optimally aligned. Optimal alignment of sequences for aligning a comparison window are known to those skilled in the art and may be conducted using known methods, e.g., using known software or computer programs such as the Smith and Waterman algorithm implemented in the EMBOSS-6.6.0 water tool using default matrix files EBLOSUM62 for protein, EDNAFULL for DNA with default gap penalties. EMBOSS-6.6.0 is available, e.g., from the following Biosoft and Open-Bio such as at the following websites: en.biosoft.net/format/emboss.html or emboss.open-bio.org/html/adm/ch01s01.html.

The terms "nucleic acid" or "polynucleotide" are used interchangeably herein and refer to any physical string of monomer units that can be corresponded to a string of nucleotides, including a polymer of nucleotides (e.g., a typical DNA polymer or polydeoxyribonucleotide or RNA polymer or polyribonucleotide), modified oligonucleotides (e.g., oligonucleotides comprising bases that are not typical to biological RNA or DNA, such as 2'-O-methylated oligonucleotides), and the like. In some embodiments, a nucleic acid or polynucleotide can be single-stranded, double-stranded, multi-stranded, or combinations thereof. Unless otherwise indicated, a particular nucleic acid or polynucleotide of the present invention optionally comprises or encodes complementary polynucleotides, in addition to any polynucleotide explicitly indicated. The nucleic acid can be present in a vector, such as in a cell, virus or plasmid.

"Operably linked" refers to the association of polynucleotides on a single nucleic acid fragment so that the function of one affects the function of the other. For example, a promoter is operably linked with a coding polynucleotide when it is capable of affecting the expression of that coding polynucleotide (i.e., that the coding polynucleotide is under the transcriptional control of the promoter). Coding polynucleotide in sense or antisense orientation can be operably linked to regulatory polynucleotides.

The term "plant" refers to any plant, particularly to agronomically useful plants (e.g. seed plants), and "plant cell" is a structural and physiological unit of the plant, which comprises a cell wall but may also refer to a protoplast. The plant cell may be in form of an isolated single cell or a cultured cell, or as a part of higher organized units such as for example, a plant tissue, or a plant organ differentiated into a structure that is present at any stage of a plant's development. A plant may be a monocotyledonous or dicotyledonous plant species.

A "plant cell" is a structural and physiological unit of a plant, comprising a protoplast and a cell wall. The plant cell may be in form of an isolated single cell or a cultured cell, or as a part of higher organized unit such as, for example, plant tissue, a plant organ, or a whole plant.

The term "plant part," as used herein, includes but is not limited to embryos, pollen, ovules, seeds, leaves, stems, shoots, flowers, branches, fruit, kernels, ears, cobs, husks, stalks, roots, root tips, anthers, plant cells including plant cells that are intact in plants and/or parts of plants, plant protoplasts, plant tissues, plant cell tissue cultures, plant calli, plant clumps, and the like. As used herein, "shoot" refers to the above ground parts including the leaves and stems. Further, as used herein, "plant cell" refers to a structural and physiological unit of the plant, which comprises a cell wall and also may refer to a protoplast. A plant cell of the present invention can be in the form of an isolated single cell or can be a cultured cell or can be a part of a higher-organized unit such as, for example, a plant tissue or a plant organ.

"Plant tissue" as used herein means a group of plant cells organized into a structural and functional unit. Any tissue of a plant in planta or in culture is included. This term includes, but is not limited to, whole plants, plant organs, plant seeds, tissue culture and any group of plant cells organized into structural and/or functional units. The use of this term in conjunction with, or in the absence of, any specific type of plant tissue as listed above or otherwise embraced by this definition is not intended to be exclusive of any other type of plant tissue.

The term "promoter," as used herein, refers to a polynucleotide, usually upstream (5') of the translation start site of a coding sequence, which controls the expression of the coding sequence by providing the recognition for RNA polymerase and other factors required for proper transcription. For example, a promoter may contain a region containing basal promoter elements recognized by RNA polymerase, a region containing the 5' untranslated region (UTR) of a coding sequence, and optionally an intron. In some embodiments, a promoter comprises or consists of the about 2 kb region upstream (5') of the translation start site of a known or predicted coding sequence.

"Regulatory elements" and "regulatory sequences" are used interchangeably herein and refer to nucleotide sequences located upstream (5' non-coding sequences), within, or downstream (3' non-coding sequences) of a coding sequence, and which influence the transcription, RNA processing or stability, or translation of the associated coding sequence. Regulatory sequences include enhancers, promoters, translational enhancer sequences, introns, terminators, and polyadenylation signal sequences. They include natural and synthetic sequences as well as sequences which may be a combination of synthetic and natural sequences. Regulatory sequences may determine expression level, the spatial and temporal pattern of expression and, for a subset of promoters, expression under inductive conditions (regulation by external factors such as light, temperature, chemicals and hormones). Regulatory sequences may be short regions of DNA sequence 6-100 base pairs that define the binding sites for trans-acting factors, such as transcription factors. Regulatory sequences may also be enhancers, longer regions of DNA sequence that can act from a distance from the core promoter region, sometimes over several kilobases from the core region. Regulatory sequence activity may be influenced by trans-acting factors including general transcription machinery, transcription factors and chromatin assembly factors.

A "terminator," as used herein, is responsible for the termination of transcription beyond the translation stop site of a coding sequence and correct mRNA polyadenylation. The termination region may be native with the transcriptional initiation region, may be native with the operably linked DNA sequence of interest, may be native with the plant host, or may be derived from another source (i.e., foreign or heterologous to the promoter, the DNA sequence of interest, the plant host, or any combination thereof). Appropriate transcriptional terminators are those that are known to function in plants and include the CAMV 35S terminator, the tml terminator, the nopaline synthase terminator and the pea rbes E9 terminator. These can be used in both monocotyledons and dicotyledons. In addition, a gene's native transcription terminator may be used. For example, a terminator may contain a region containing the 3' untranslated region (UTR) of a coding sequence, and optionally additional 3' non-transcribed sequence. In some embodiments, a terminator comprises or consists of the about 1 kb region downstream (3') of the translation stop site of a known or predicted coding sequence.

A "selectable marker" or "selectable marker gene" refers to a gene whose expression in a plant cell gives the cell a selective advantage. "Positive selection" refers to a transformed cell acquiring the ability to metabolize a substrate that it previously could not use or could not use efficiently, typically by being transformed with and expressing a positive selectable marker gene. This transformed cell thereby grows out of the mass of nontransformed tissue. Positive selection can be of many types from inactive forms of plant growth regulators that are then converted to active forms by the transferred enzyme to alternative carbohydrate sources that are not utilized efficiently by the nontransformed cells, for example mannose, which then become available upon transformation with an enzyme, for example phosphomannose isomerase, that allows them to be metabolized. Nontransformed cells either grow slowly in comparison to transformed cells or not at all. Other types of selection may be due to the cells transformed with the selectable marker gene gaining the ability to grow in presence of a negative selection agent, such as an antibiotic or an herbicide, compared to the ability to grow of non-transformed cells. A selective advantage possessed by a transformed cell may also be due to the loss of a previously possessed gene in what is called "negative selection". In this, a compound is added that is toxic only to cells that did not lose a specific gene (a negative selectable marker gene) present in the parent cell (typically a transgene).

Examples of selectable markers include, but are not limited to, genes that provide resistance or tolerance to antibiotics such as kanamycin (Dekeyser et al. 1989, Plant Phys 90:217-23), spectinomycin (Svab and Maliga 1993, Plant Mol Biol 14:197-205), streptomycin (Maliga et al. 1988, Mol Gen Genet 214:456-459), hygromycin B (Waldron et al. 1985, Plant Mol Biol 5:103-108), bleomycin (Hille et al. 1986, Plant Mol Biol 7:171-176), sulphonamides (Guerincau et al. 1990, Plant Mol Biol 15:127-136), streptothricin (Jelenska et al. 2000, Plant Cell Rep 19:298-303), or chloramphenicol (De Block et al. 1984, EMBO J 3:1681-1689). Other selectable markers include genes that provide resistance or tolerance to herbicides, such as the S4 and/or Hra mutations of acetolactate synthase (ALS) that confer resistance to herbicides including sulfonylureas, imidazolinones, triazolopyrimidines, and pyrimidinyl thiobenzoates; 5-enol-pyrovyl-shikimate-3-phosphate-synthase (EPSPS) genes, including but not limited to those described in U.S. Pat. Nos. 4,940,935, 5,188,642, 5,633,435, 6,566,587, 7,674,598 (as well as all related applications) and the glyphosate N-acetyltransferase (GAT) which confers resistance to glyphosate (Castle et al. 2004, Science 304:1151-1154, and U.S. Patent Application Publication Nos. 20070004912, 20050246798, and 20050060767); BAR which confers resistance to glufosinate (see e.g., U.S. Pat. No. 5,561,236); aryloxy alkanoate dioxygenase or AAD-1, AAD-12, or AAD-13 which confer resistance to 2,4-D;

genes such as *Pseudomonas* HPPD which confer HPPD resistance; Sprotophorphyrinogen oxidase (PPO) mutants and variants, which confer resistance to peroxidizing herbicides including fomesafen, acifluorfen-sodium, oxyfluorfen, lactofen, fluthiacet-methyl, saflufenacil, flumioxazin, flumiclorac-pentyl, carfentrazone-ethyl, sulfentrazone); and genes conferring resistance to dicamba, such as dicamba monoxygenase (Herman et al. 2005, J Biol Chem 280: 24759-24767 and U.S. Pat. No. 7,812,224 and related applications and patents). Other examples of selectable markers can be found in Sundar and Sakthivel (2008, J Plant Physiology 165:1698-1716), herein incorporated by reference.

Other selection systems include using drugs, metabolite analogs, metabolic intermediates, and enzymes for positive selection or conditional positive selection of transgenic plants. Examples include, but are not limited to, a gene encoding phosphomannose isomerase (PMI) where mannose is the selection agent, or a gene encoding xylose isomerase where D-xylose is the selection agent (Haldrup et al. 1998, Plant Mol Biol 37:287-96). Finally, other selection systems may use hormone-free medium as the selection agent. One non-limiting example the maize homeobox gene kn1, whose ectopic expression results in a 3-fold increase in transformation efficiency (Luo et al. 2006, Plant Cell Rep 25: 403-409). Examples of various selectable markers and genes encoding them are disclosed in Miki and McHugh (J Biotechnol, 2004, 107:193-232; incorporated by reference).

In some embodiments of the disclosure, the selectable marker may be plant derived. An example of a selectable marker which can be plant derived includes, but is not limited to, 5-enolpyruvylshikimate-3-phosphate synthase (EPSPS). The enzyme 5-enolpyruvylshikimate-3-phosphate synthase (EPSPS) catalyzes an essential step in the shikimate pathway common to aromatic amino acid biosynthesis in plants. The herbicide glyphosate inhibits EPSPS, thereby killing the plant. Transgenic glyphosate-tolerant plants can be created by the introduction of a modified EPSPS transgene which is not affected by glyphosate (for example, U.S. Pat. No. 6,040,497; incorporated by reference). Other examples of a modified plant EPSPS which can be used as a selectable marker in the presence of glyphosate includes a P106L mutant of rice EPSPS (Zhou et al 2006, Plant Physiol 140:184-195) and a P106S mutation in goosegrass EPSPS (Bacrson et al 2002, Plant Physiol 129:1265-1275). Other sources of EPSPS which are not plant derived and can be used to confer glyphosate tolerance include but are not limited to an EPSPS P101S mutant from *Salmonella typhimurium* (Comai et al 1985, Nature 317:741-744) and a mutated version of CP4 EPSPS from *Agrobacterium* sp. Strain CP4 (Funke et al 2006, PNAS 103:13010-13015). Although the plant EPSPS gene is nuclear, the mature enzyme is localized in the chloroplast (Mousdale and Coggins 1985, Planta 163:241-249). EPSPS is synthesized as a preprotein containing a transit peptide, and the precursor is then transported into the chloroplast stroma and proteolytically processed to yield the mature enzyme (della-Cioppa et al. 1986, PNAS 83:6873-6877). Therefore, to create a transgenic plant which has tolerance to glyphosate, a suitably mutated version of EPSPS which correctly translocates to the chloroplast could be introduced. Such a transgenic plant then has a native, genomic EPSPS gene as well as the mutated EPSPS transgene. Glyphosate could then be used as a selection agent during the transformation and regeneration process, whereby only those plants or plant tissue that are successfully transformed with the mutated EPSPS transgene survive.

The term "transformation" as used herein refers to the transfer of a nucleic acid into a host cell, preferably resulting in genetically stable integration, which includes integration into a chromosome and heritable extrachromosomal events. In some particular embodiments, the introduction into a plant, plant part and/or plant cell is via bacterial-mediated transformation, particle bombardment transformation (also called biolistic particle transformation), calcium-phosphate-mediated transformation, cyclodextrin-mediated transformation, electroporation, liposome-mediated transformation, nanoparticle-mediated transformation, polymer-mediated transformation, virus-mediated nucleic acid delivery, whisker-mediated nucleic acid delivery, microinjection, sonication, infiltration, polyethylene glycol-mediated transformation, protoplast transformation, or any other electrical, chemical, physical and/or biological mechanism that results in the introduction of a nucleic acid into the plant, plant part and/or cell thereof, or a combination thereof. General guides to various plant transformation methods known in the art include Miki et al. ("Procedures for Introducing Foreign DNA into Plants" in Methods in Plant Molecular Biology and Biotechnology, Glick, B. R. and Thompson, J. E., Eds. (CRC Press, Inc., Boca Raton, 1993), pages 67-88) and Rakowoczy-Trojanowska (2002, Cell Mol Biol Lett 7:849-858 (2002)).

Procedures for transforming plants are well known and routine in the art and are described throughout the literature. Non-limiting examples of methods for transformation of plants include transformation via bacterial-mediated nucleic acid delivery (e.g., via bacteria from the genus *Agrobacterium*), viral-mediated nucleic acid delivery, silicon carbide or nucleic acid whisker-mediated nucleic acid delivery, liposome mediated nucleic acid delivery, microinjection, microparticle bombardment, calcium-phosphate-mediated transformation, cyclodextrin-mediated transformation, electroporation, nanoparticle-mediated transformation, sonication, infiltration, PEG-mediated nucleic acid uptake, as well as any other electrical, chemical, physical (mechanical) and/or biological mechanism that results in the introduction of nucleic acid into the plant cell, including any combination thereof. General guides to various plant transformation methods known in the art include Miki et al. ("Procedures for Introducing Foreign DNA into Plants" in Methods in *Plant Molecular Biology and Biotechnology*, Glick, B. R. and Thompson, J. E., Eds. (CRC Press, Inc., Boca Raton, 1993), pages 67-88) and Rakowoczy-Trojanowska (*Cell Mol Biol Lett* 7:849-858 (2002)).

*Agrobacterium*-mediated transformation is a commonly used method for transforming plants because of its high efficiency of transformation and because of its broad utility with many different species. *Agrobacterium*-mediated transformation typically involves transfer of the binary vector carrying the foreign DNA of interest to an appropriate *Agrobacterium* strain that may depend on the complement of vir genes carried by the host *Agrobacterium* strain either on a co-resident Ti plasmid or chromosomally (Uknes et al. 1993, Plant Cell 5:159-169). The transfer of the recombinant binary vector to *Agrobacterium* can be accomplished by a tri-parental mating procedure using *Escherichia coli* carrying the recombinant binary vector, a helper *E. coli* strain that carries a plasmid that is able to mobilize the recombinant binary vector to the target *Agrobacterium* strain. Alternatively, the recombinant binary vector can be transferred to *Agrobacterium* by nucleic acid transformation (Höfgen and Willmitzer 1988, *Nucleic Acids Res* 16:9877).

Transformation of a plant by recombinant *Agrobacterium* usually involves co-cultivation of the *Agrobacterium* with explants from the plant and follows methods well known in the art. Transformed tissue is typically regenerated on selection medium carrying an antibiotic or herbicide resistance marker between the binary plasmid T-DNA borders.

Another method for transforming plants, plant parts and plant cells involves propelling inert or biologically active particles at plant tissues and cells. See, e.g., U.S. Pat. Nos. 4,945,050; 5,036,006 and 5,100,792. Generally, this method involves propelling inert or biologically active particles at the plant cells under conditions effective to penetrate the outer surface of the cell and afford incorporation within the interior thereof. When inert particles are utilized, the vector can be introduced into the cell by coating the particles with the vector containing the nucleic acid of interest. Alternatively, a cell or cells can be surrounded by the vector so that the vector is carried into the cell by the wake of the particle. Biologically active particles (e.g., dried yeast cells, dried bacteria or a bacteriophage, each containing one or more nucleic acids sought to be introduced) also can be propelled into plant tissue.

Thus, in particular embodiments of the present invention, a plant cell can be transformed by any method known in the art and as described herein and intact plants can be regenerated from these transformed cells using any of a variety of known techniques. Plant regeneration from plant cells, plant tissue culture and/or cultured protoplasts is described, for example, in Evans et al. (*Handbook of Plant Cell Cultures*, Vol. 1, MacMilan Publishing Co. New York (1983)); and Vasil I. R. (ed.) (*Cell Culture and Somatic Cell Genetics of Plants*, Acad. Press, Orlando, Vol. I (1984), and Vol. II (1986)). Methods of selecting for transformed transgenic plants, plant cells and/or plant tissue culture are routine in the art and can be employed in the methods of the invention provided herein.

A "transgenic plant" is a plant having one or more plant cells that contain a heterologous DNA sequence.

As used herein, "vector" includes reference to a nucleic acid used in transfection of a host cell and into which can be inserted a polynucleotide. Vectors are often replicons. Expression vectors permit transcription of a nucleic acid inserted therein. "Vector" is defined to include, inter alia, any plasmid, cosmid, phage or *Agrobacterium* binary vector in double or single stranded linear or circular form which may or may not be self transmissible or mobilizable, and which can transform prokaryotic or eukaryotic host either by integration into the cellular genome or exist extrachromosomally (e.g. autonomous replicating plasmid with an origin of replication). Specifically included are shuttle vectors by which is meant a DNA vehicle capable, naturally or by design, of replication in two different host organisms, which may be selected from actinomycetes and related species, bacteria and eukaryotic (e.g. higher plant, mammalian, yeast or fungal cells).

DETAILED DESCRIPTION

Aspects of the disclosure relate to regulatory elements, such as promoters and terminators, useful for expression of heterologous sequences in plants, such as soybean.

In some aspects, the disclosure provides a nucleotide sequence having at least 90% identity (e.g., at least 91%, at least 92%, at least 93%, at least 94%, at least 95%, at least 96%, at least 97%, at least 98%, at least 99%, or 100% identity) with one or more of SEQ ID NOs: 1-30, such as 1-5 or 8-29. In some embodiments, the nucleotide sequence comprises one or more of SEQ ID NOs: 1-30, such as 1-5 or 8-29. In some embodiments, the nucleotide sequence comprises one of SEQ ID Nos: 1-30, such as 1-5 and one of SEQ ID Nos: 8-29. In some embodiments, the disclosure provides a nucleotide sequence comprising a fragment, e.g., a biologically active fragment, of one or more of SEQ ID NOs: 1-30, such as 1-5 or 8-29 (e.g., a fragment of at least 100, at least 200, at least 300, at least 400, at least 500, at least 600, at least 700, at least 800, at least 900 or at least 1000 contiguous nucleotides of one or more of SEQ ID NOs: 1-30, such as 1-5 or 8-29). In some embodiments, the disclosure provides a nucleotide sequence comprising a fragment, e.g., a biologically active fragment, of one or more of SEQ ID NOs: 1-30, such as 1-5 or 8-29 (e.g., a fragment of at least 100, at least 200, at least 300, at least 400, at least 500, at least 600, at least 700, at least 800, at least 900 or at least 1000 contiguous nucleotides of one or more of SEQ ID NOs: 1-30, such as 1-5 or 8-29).

In some aspects, the disclosure provides an expression cassette. In some embodiments, the expression cassette comprises a nucleotide sequence having at least 90% identity (e.g., at least 91%, at least 92%, at least 93%, at least 94%, at least 95%, at least 96%, at least 97%, at least 98%, at least 99%, or 100% identity) with one or more of SEQ ID NOs: 1-30, such as 1-5 or 8-29, wherein the nucleotide sequence is operably linked to a heterologous nucleotide sequence. In some embodiments, the expression cassette comprises a nucleotide sequence comprising one or more of SEQ ID NOs: 1-30, such as 1-5 or 8-29. In some embodiments, the expression cassette comprises a nucleotide sequence comprising one of SEQ ID NOs: 1-30, such as 1-5 and one of 8-29. In some embodiments, the expression cassette comprises a nucleotide sequence comprising a fragment, e.g., a biologically active fragment, of one or more of SEQ ID NOs: 1-30, such as 1-5 or 8-29 (e.g., a fragment of at least 100, at least 200, at least 300, at least 400, at least 500, at least 600, at least 700, at least 800, at least 900 or at least 1000 contiguous nucleotides of one or more of SEQ ID NOs: 1-30, such as 1-5 or 8-29). In some embodiments, the expression cassette further comprises a selectable marker.

In some embodiments, the heterologous sequence is a nucleic acid of interest that encodes an RNA or protein of interest. In some embodiments, the RNA or protein of interest is capable of conferring upon a plant a desired characteristic such as antibiotic resistance, virus resistance, insect resistance, disease resistance, resistance to other pests, herbicide tolerance, improved nutritional value, improved performance in an industrial process or altered reproductive capability. In some embodiments, the RNA or protein of interest comprises a genome editing agent, e.g., a CRISPR/Cas agent (such as a Cas protein and/or guide RNA), a TALEN, a DNA-guided nuclease, a meganuclease, a recombinase, or a zinc finger nuclease. In some embodiments, the heterologous nucleotide sequence encodes a selectable marker.

In some embodiments, the expression cassette is comprised within a vector, such as a plasmid, virus, or *Agrobacterium*. In some embodiments, the expression cassette is comprised within a plant cell. In some embodiments, the plant cell is a dicot cell. In some embodiments, the plant cell is a *Glycine max* cell. In some embodiments, the *Glycine max* cell is an elite *Glycine max* cell.

In some embodiments, the expression cassette is comprised within a transgenic plant. In some embodiments, the plant is a dicot. In some embodiments, the plant is a *Glycine max* plant. In some embodiments, the *Glycine max* plant is an elite *Glycine max* plant.

In some embodiments, the disclosure provides a seed from a transgenic plant, e.g., a seed comprising the expression cassette.

In some embodiments, the disclosure provides a commodity product produced from a transgenic plant or part thereof, e.g., a commodity product comprising the expression cassette. In some embodiments, the commodity product is selected from the group consisting of whole or processed seeds, flour, protein isolates, concentrates, liquids, syrups, pastes, sauces or other food or product.

Other aspects of the disclosure relate to a method, e.g., a transformation method, comprising introducing an expression cassette or vector as described herein into a plant or plant cell. In some embodiments, the introducing comprises *Agrobacterium*-mediated transformation. In some embodiments, the introducing comprises particle bombardment. In some embodiments of the method, the method further comprises placing the plant or plant cell under conditions whereby an RNA or protein of interest and/or a selectable marker is expressed from the expression cassette or vector. In some embodiments, the conditions are appropriate growth or maintenance conditions for the plant or plant cell. In some embodiments of the method, the method further comprises crossing the plant to a second plant to produce a progeny plant. In some embodiments of the method, the method further comprises self-crossing the plant to produce a progeny plant. In some embodiments, the plant or plant cell is a dicot plant or plant cell. In some embodiments, the plant or plant cell is a *Glycine max* plant or plant cell. In some embodiments, the plant or plant cell is an elite *Glycine max* plant or plant cell. In some embodiments, the second plant is an elite *Glycine max* plant.

Hereinafter, the present invention will be described in detail by the following examples. However, the following examples are illustrative of the present invention, and the scope of the present invention is not limited by the following examples.

EXAMPLES

Example 1: Identification and Characterization of Novel Promoter Sequences

Methods

Reference genomes from wild *Glycine* species (*Glycine argyrea*, *Glycine canescens*, *Glycine clandestine*, and *Glycine tomentella*) were used and candidate promoter sequences were obtained based on identification of orthologues to certain genes from *Glycine* max: Ubiquitin (Ubi), s-adenosyl methionine (SAM), actin depolymerizing factor (ADF3), and Translation elongation factor EF-1 alpha (EF1a). Additional candidate promoter sequences were identified using RNAseq data to identify genes in *Glycine max* with expression between 12-18 log 2 normalized data and putative promoter sequences from those genes were added as candidates. The candidate promoter sequences were the 2 kb region upstream of the predicted or known translation start site. The candidate promoter sequences were expected to contain the basal promoter elements, as well as the 5' UTR and potentially an intron (depending on the structure of the predicted or known coding sequence).

Vectors were designed for each candidate promoter, each of which contained a soy codon-optimized Bx9, a maize UDP-Glucosyl transferase, benzoxazinoid 9 (see International Publication No. WO2018213022 for description of maize Bx9), as a reporter gene and the terminator sequence tMt51186 (SEQ ID NO: 30). For cloning convenience, mutations were made in the promoter sequence to remove any NcoI and SacI sites. The ATGs in the 5' UTR were also mutated.

Vectors were first screened by transient transformation. All vectors were compared to average expression levels of a vector containing a baseline positive control promoter (prGmSAMS, SEQ ID NO: 7). Transient transformation was performed using 14 day old soy plants. The first trifoliate set of leaves were damaged on the abaxial side using a wire brush. The plant leaves were then immersed in an *Agrobacterium* solution containing the test construct in addition to an internal control construct at a 1:1 ratio. Each *Agrobacterium* was adjusted to OD=1.0 at 600 nm. The immersed plants were placed in a vacuum chamber and vacuum was applied for 3-5 minutes. The infiltrated plants were placed in a tray with a clear plastic lid to maintain the humidity. The infiltrated leaves were sampled in 96 well block for ELISA assay 4 days after infiltration. The ELISA employed two polyclonal antibodies which have been produced against the BX9 protein. High-binding polystyrene plates (Nunc Maxisorp #430341) were coated at 4 C overnight with 10 µg/ml goat anti-BX9 in 25 mM borate, 75 mM NaCl, pH 8.5. Plates were washed five times with Phosphate Buffered Saline+ 0.05% Tween-20 (PBST). Standards (160, 80, 40, 20, 10, 5, 2.5, and 0 ng/ml of purified BX9 protein) were prepared in ELISA diluent (PBST+1% bovine serum albumin). One hundred microliters of each appropriately diluted sample or standard was added to the plate, incubated for 1 hr at ambient temperature with shaking at 200 rpm, and washed five times. Rabbit anti-BX9 (100 ul/well) diluted to 1 µg/ml in ELISA diluent was then added to the plate, incubated for 1 hr at ambient temperature with shaking at 200 rpm, and washed as before. Donkey anti-rabbit conjugated to alkaline phosphatase (Jackson ImmunoResearch, West Grove, PA) at 1 µg/ml in ELISA diluent was added to the plate (100 ul/well), incubated at ambient temperature with shaking at 200 rpm, and washed. Substrate p-nitrophenyl phosphate (Surmodics, Eden Prairie, MN) was added and allowed to develop for 15-30 min at ambient temperature. The absorbance was measured at 405 nm using a microplate reader (BioTek Powerwave XS2, Winooski, VT). The standard curve used a four-parameter curve fit to plot the concentrations versus the absorbance. To normalize for extraction efficiency, the concentration of the analyte (BX9) was divided by the concentration of the total soluble protein (TSP). TSP was measured using the Pierce™ BCA (bicinchoninic acid) protein assay (ThermoFisher Scientific).

Based on the data generated, a vector containing prGaSAMS599400 (see Table 1) was selected as a negative control for additional studies.

A subset of the vectors were then selected and stably transformed into soybean plants and were validated at T0 and T1 events and compared to the positive control and negative control. Soybean (*Glycine max*, variety 06KG212440) seeds were sterilized with chlorine gas overnight. Sterilized seeds were imbibed in germination media (SoyGerm) with the hilum side facing down. The seeds were incubated at 22-24° C. in the dark for about 16 hours. Imbibed seeds were used to prepare explants as described in International Publication No. WO2004000006. The prepared explants were immediately infected with a disarmed Chry5d3 *Agrobacterium tumafaciens* strain containing respective binary vector by mixing the isolated immature seed explants with bacterial suspension in infection medium (SoyInf: ½×MS salts, 1×B5 vitamins, 2 g/L sucrose, 1 g/L glucose, 4 g/L MES [2-(Nmorpholino) ethanesulfonic acid], 2 mg/L zeatin riboside and 200 µM acetosyringone, pH 5.4).

The mixture was incubated for at least 30 minutes or up to overnight at room temperature. Following infection, the explants were removed from the *Agrobacterium* suspension and placed on a co-cultivation medium such as SoyCCM 2Zt (½×MS salts, 1×B5 vitamins, 2 g/L sucrose, 1 g/L glucose, 4 g/L MES, 2 mg/L zeatin riboside and 200 μM acetosyringone, pH 5.4, with 6 g/L purified agar), preferably adaxial (flat) side up. The co-cultivation plates were incubated for 3 to 5 days at 23° C. in the dark.

After co-cultivation, elongated hypocotyls of the explants were trimmed back just below the cotyledon nodes. The explants were transferred to recovery medium without selection agent such as SoyR0 (3.1 g/L B5 salts, 1×B5 vitamins, 0.8×MS Iron, 3% sucrose, 1 g/L MES, 2 mg/L BAP, 0.1 g/L Asparagine, 50 mg/L timentin, 200 mg 1-1 cefotaxime and 50 mg/L vancomycin, 7 g/L agar, pH 5.7) with appropriate antibiotics to inhibit *Agrobacterium* growth. The cotyledon node end was inserted into the media. The plates with the explants were incubated for about 7-10 days at 24 degrees C. under 16 hours light/8 hours dark regimen, and >80 μE/m2/s.

After the recovery period, the explants were transferred to regeneration media such as SoyRI (3.1 g/L B5 salts, 1×B5 vitamins, 0.8×MS Iron, 3% sucrose, 1 g/L MES, 2 mg/L BAP, 0.1 g/L Asparagine, 7 g/L purified agar, pH 5.7, with appropriate selection agent, e.g. ALS herbicide or glyphosate) along with the cotyledon for about 2-3 weeks. After about 2-3 weeks in regeneration/selection media such as SoyR1, developing multiple shoots clusters were transferred to elongation medium SoyE1 (1×MS basal salts, 1×B5 vitamins, 0.8×MS iron, 3% sucrose, 0.6 g/L MES, 50 mg/L asparagine, 100 mg/L glutamic acid, 0.1 mg/L IAA, 0.5 mg/L GA3, 1 mg/L zeatin riboside, 50 mg/L Ticarcillin, 75 mg/L cefotaxime, pH 5.7, solidified with 0.7% agar along with appropriate selection agent, e.g. ALS herbicide or glyphosate) for shoot elongation. Subcultures to fresh elongation media SoyE1 were performed every 2-4 weeks until elongated shoots (>3 cm) were long enough to be transferred into soil for direct rooting in a tray inside a hole-less secondary tray filled with water to keep the soil wet. The plastic dome was removed after about 2 weeks and leaves were sampled for Taqman analysis to identify plants positive for gene-of-interest.

Results 31 vectors containing 31 different candidate promoters were tested in a transient transformation assay. Of those 31, five were found to have expression levels comparable to or better than a positive control promoter known to have high constitutive expression (see Table 1). A promoter having poor expression relative to the control in the assay, prGaSAMS599400, was selected to be used as a negative control in the stable transformation assay.

TABLE 1

Promotor transient transformation expression assay results

| Promoter name | Promoter SEQ ID NO | # Replicates (n) | % Expression of Baseline Control | Coefficient of variation (% CV) Replicates |
|---|---|---|---|---|
| prGaUbiPI599400 | 1 | 10 | 287% | 15% |
| prGcUbiPI339656 | 2 | 5 | 237% | 28% |
| prGtUbiPI505267 | 3 | 13 | 164% | 40% |
| prGaEF1aPI599400 | 4 | 10 | 104% | 42% |
| prGmEF1aGlyma17G186600 | 5 | 15 | 74% | 27% |
| prGaSAMS599400 | 6 | 8 | 12% | 23% |
| prGmSAMS (control) | 7 | 16 | 100% | 52% |

Four of the candidate promoters shown to have better activity in Table 1 compared to the positive control were then assayed in a stable transformation assay.

The four candidate promoters were shown to drive higher Bx9 expression in seedling leaf than the positive control in both transient and TO events (see Table 2, TO data are from single copy events).

TABLE 2

Expression of reporter in seedling leaf

| Construct | Cassette | Transient ELISA | |
|---|---|---|---|
| | | n | % to control |
| 24244 | prGaUbiPI599400, Bx9, tMt51186 | 10 | 287 |
| 24245 | prGcUbiPI339656, Bx9, tMt51186 | 5 | 237 |
| 24246 | prGtUbiPI505267, Bx9, tMt51186 | 13 | 164 |
| 24247 | prGaEF1aPI599400, Bx9, tMt51186 | 16 | 104 |
| 24249 (negative control) | prGaSAMSPI599400, Bx9, tMt51186 | 8 | 12 |
| 24276 (positive control) | prGmSAMS, Bx9, tMt51186 | 27 | 100 |

| Construct | Cassette (promoter, coding sequence, terminator) | Stable transformant ELISA | | |
|---|---|---|---|---|
| | | n | avg (ng/mg TSP) | % to control |
| 24244 | prGaUbiPI599400, Bx9, tMt51186 | 8 | 95 | 188 |
| 24245 | prGcUbiPI339656, Bx9, tMt51186 | 8 | 81 | 161 |
| 24246 | prGtUbiPI505267, Bx9, tMt51186 | 13 | 75 | 149 |
| 24247 | prGaEF1aPI599400, Bx9, tMt51186 | 13 | 83 | 164 |

TABLE 2-continued

| | Expression of reporter in seedling leaf | | | |
|---|---|---|---|---|
| 24249 (negative control) | prGaSAMSPI599400, Bx9, tMt51186 | 15 | 17 | 34 |
| 24276 (positive control) | prGmSAMS, Bx9, tMt51186 | 14 | 50 | 100 |

| | | T0 events | | T1 events | |
|---|---|---|---|---|---|
| Construct (promoter) | Cassette | Average (ng/mg TSP) | % to prGmUbi control | Average (ng/mg TSP) | % to prGmUbi control |
| 24705 (prGaUbiPI599400-02) | prGaUbiPI599400-02, CCP4EPSPSCTP2-01, tPsE9-01 | 773 | 71 | 1269 | 70 |
| 23830 (prGmUbi1-02, positive control) | prGmUbi1-02, CCP4EPSPSCTP2-01, tPsE9-01 | 1092 | 100 | 1809 | 100 |

Figure 1:
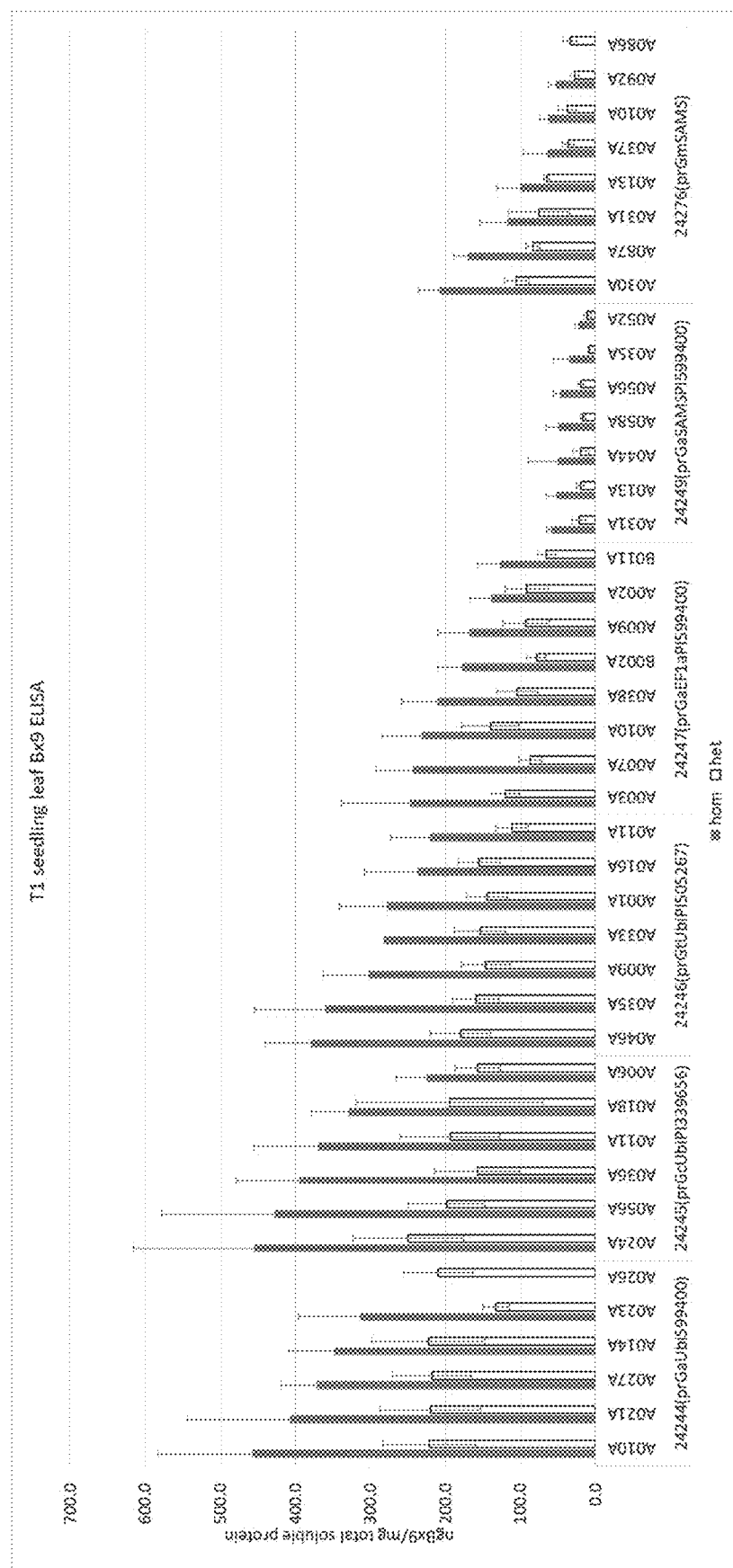
FIG. 1 is a graph showing Bx9 expression in T1 soybean seedling leaf. Hom=homozygous, Het=heterozygous. 24244=prGaUbi599400; 24245=prGcUbiPI339656; 24246=prGtUbiPI505267; 24247=prGaEF1aPI599400; 24249=prGaSAMSPI599400, negative control.

The four candidate promoters were also shown to drive higher Bx9 expression in TI seedling leaf compared to the positive control (see FIG. 1). The four candidate promoters were also shown to drive higher Bx9 expression in T1 mature leaf and T1 root at reproductive stage compared to the positive control (see FIGS. 2 and 3). The four candidate promoters were also shown to drive higher or comparable Bx9 expression in T1 seed pod compared to the positive control (see FIG. 4). Three of the four candidate promoters were also shown to drive higher or comparable Bx9 expression in T1 embryo compared to the positive control (see FIG. 5). Promoter prGaUbiPI599400 was modified to create prGaUbiPI599400-02 which drove expression of cCP4EPSPSCTP2-01 at acceptable levels. Additional data showing the comparison between the promoters at different stages is shown below in Table 3.

TABLE 3

| | Promoter comparison at the construct level | | | | |
|---|---|---|---|---|---|
| | | Vegetative stage Seedling leaf | | Reproductive stage Mature leaf | |
| Construct (promoter) | N | Average (ng/mg TSP) | % to prSAMS control | Average (ng/mg TSP) | % to prSAMS control |
| 24244 (prGaUbi599400) | 15 | 369 | 333 | 135 | 656 |
| 24245 (prGcUbiPI339656) | 18 | 364 | 329 | 123 | 597 |
| 24246 (prGtUbiPI505267) | 18 | 291 | 262 | 88 | 426 |
| 24247 (prGaEF1aPI599400) | 24 | 183 | 165 | 48 | 234 |
| 24249 (prGaSAMSPI599400, negative control) | 21 | 42 | 38 | 13 | 62 |
| 24276 (prGmSAMS, positive control) | 21 | 111 | 100 | 21 | 100 |

| | | Reproductive stage | | | | | |
|---|---|---|---|---|---|---|---|
| | | Root | | Seed pod shell | | Embryo | |
| Construct (promoter) | N | Average (ng/mg TSP) | % to prSAMS control | Average (ng/mg TSP) | % to prSAMS control | Average (ng/mg TSP) | % to prGmSAMS control |
| 24244 (prGaUbi599400) | 15 | 1202 | 1251 | 1268 | 243 | 4211 | 207 |
| 24245 (prGcUbiPI339656) | 18 | 468 | 488 | 1210 | 232 | 454 | 22 |
| 24246 (prGtUbiPI505267) | 18 | 338 | 352 | 1425 | 273 | 1535 | 75 |
| 24247 (prGaEF1aPI599400) | 24 | 212 | 221 | 586 | 112 | 641 | 31 |
| 24249 (prGaSAMSPI599400, negative control) | 21 | 11 | 12 | 53 | 10 | 64 | 3 |

TABLE 3-continued

| Promoter comparison at the construct level | | | | | | | |
|---|---|---|---|---|---|---|---|
| 24276 (prGmSAMS, positive control) | 21 | 96 | 100 | 522 | 100 | 2039 | 100 |

Taken together, these data show that the four selected candidate promoters are highly expressed in multiple tissues and are expected to be useful as constitutive promoters for use in expression constructs in soybean.

Example 2: Identification and Characterization of Novel Terminator Sequences Methods Candidate terminator sequences were derived from the genes tested in Example 1 and tested for terminator activity. The candidate terminator sequences were the 1 kb region downstream of the predicted or known translation stop site. The candidate terminator sequences were expected to contain the 3' UTR and potentially additional 3' non-transcribed sequence (depending on the structure of the predicted or known coding sequence).

Vectors were designed for each candidate terminator, each of which contained Bx9 as a reporter gene and the promoter sequence prGmSAMS (SEQ ID NO: 7). Vectors were first screened by transient transformation using the methods describe in Example 1. All vectors were compared to average expression levels of a vector containing a baseline positive control terminator (tMt51186, SEQ ID NO: 30). Expression levels were measured by ELISA as described in Example 1.

A subset of the vectors were then selected and stably transformed into soybean plants and were validated at T0 and T1 events and compared to the positive control and negative control. The transformation and analysis methods are the same as those described in Example 1.

Results 29 vectors containing 29 different candidate terminators were tested in a transient transformation assay. Of those 29, 22 were found to have expression levels comparable to or better than a positive control terminator known to support high constitutive expression (see Table 4).

TABLE 4

Terminator transient transformation expression assay results

| Terminator Name | Terminator SEQ ID NO | % Baseline Ctl | # Replicates | % CV |
|---|---|---|---|---|
| tGmEF1a17G18600 | 8 | 370% | 8 | 35% |
| tGtUbiPI505267 | 9 | 339% | 8 | 57% |
| tGaEF1aPI599400 | 10 | 311% | 8 | 11% |
| tGmMIP02G255000 | 11 | 272% | 8 | 18% |
| tGtMIPPI505267 | 12 | 216% | 7 | 13% |
| tGlMIPPI546970 | 13 | 214% | 8 | 24% |
| tGcUbiPI339656 | 14 | 210% | 8 | 27% |
| tGtEF1aPI441001 | 15 | 204% | 8 | 32% |
| tGaUbiPI599400 | 16 | 196% | 8 | 54% |
| tGcUbiPI595799 | 17 | 185% | 8 | 31% |
| tGcSAMSPI339656 | 18 | 148% | 8 | 26% |
| tGmRBPGlyma11G117300 | 19 | 144% | 8 | 35% |
| tGmMIPGlyma19G186100 | 20 | 133% | 8 | 24% |
| tGaSAMSPI599400 | 21 | 120% | 8 | 43% |
| tGaMIPPI505151 | 22 | 118% | 5 | 63% |
| tGtEF-02PI441001 | 23 | 114% | 8 | 32% |

TABLE 4-continued

Terminator transient transformation expression assay results

| Terminator Name | Terminator SEQ ID NO | % Baseline Ctl | # Replicates | % CV |
|---|---|---|---|---|
| tGaEF-02PI599400 | 24 | 110% | 8 | 60% |
| tGaADF3PI599400 | 25 | 105% | 8 | 13% |
| tGcEF-02PI483193 | 26 | 103% | 8 | 32% |
| tGmPOXGlyma07G260300 | 27 | 97% | 8 | 12% |
| tGtSAMsPI505267 | 28 | 96% | 8 | 29% |
| tGaRBPPI599400 | 29 | 86% | 8 | 25% |
| Baseline Control (tMt51186) | 30 | 100% | 28 | 57% |

Six of the candidate terminators shown to have better activity in Table 4 compared to the positive control were then assayed in a stable transformation assay.

The six candidate terminators were shown to drive higher Bx9 expression in seedling leaf than the positive control in both transient and T0 events (see Table 5, T0 data are from single copy events).

TABLE 5

Expression of reporter in seedling leaf

| Construct | Cassette (promoter, coding sequence, terminator) | Transient ELISA | | Stable Transformant ELISA | |
|---|---|---|---|---|---|
| | | n | % to control | n | avg (ng/mg TSP) | % to control |
| 24321 | prGmSAMS, Bx9, tGmEF1a17G18600 | 8 | 370 | 12 | 175 | 282 |
| 24322 | prGmSAMS Bx9, tGaEF1aPI599400 | 8 | 339 | 7 | 192 | 310 |
| 24323 | prGmSAMS, Bx9, tGtUbiPI505267 | 8 | 311 | 9 | 131 | 211 |
| 24324 | prGmSAMS, Bx9, tGcUbiPI339656 | 8 | 272 | 6 | 156 | 252 |
| 24325 | prGmSAMS, Bx9, tGmMIP02G255000 | 8 | 214 | 9 | 113 | 182 |
| 24326 | prGmSAMS, Bx9, tGlMIPPI546970 | 8 | 210 | 8 | 160 | 258 |
| 24327 (positive control) | prGmSAMS, Bx9, tMt51186 | 8 | 100 | 8 | 62 | 100 |

The six candidate terminators were also shown to drive higher or comparable Bx9 expression in T1 seedling leaf compared to the positive control (see FIG. 6). The six candidate terminators were also shown to drive higher or comparable Bx9 expression in T1 mature leaf and T1 root at reproductive stage compared to the positive control (see FIGS. 7 and 8). The six candidate terminators were also shown to drive higher or comparable Bx9 expression in T1 seed pod compared to the positive control (see FIG. 9). Five of the six candidate terminators were also shown to drive higher or comparable Bx9 expression in T1 embryo compared to the positive control (see FIG. 10). Additional data showing the comparison between the promoters at different stages is shown below in Table 6.

TABLE 6

Terminator comparison at the construct level

| Construct (terminator) | N | Vegetative stage Seedling Leaf | | Reproductive stage Mature Leaf | |
|---|---|---|---|---|---|
| | | Average (ng/mg TSP) | % to tMt51186 control | Average (ng/mg TSP) | % to tMt51186 control |
| 24321 (tGmEF1a17G18600) | 18 | 372 | 280 | 446 | 233 |
| 24322 (tGaEF1aPI599400) | 12 | 491 | 369 | 536 | 279 |
| 24323 (tGtUbiPI505267) | 18 | 209 | 157 | 448 | 234 |
| 24324 (tGcUbiPI339656) | 17 | 149 | 112 | 243 | 127 |
| 24325 (tGmMIP02G255000) | 15 | 225 | 169 | 309 | 161 |
| 24326 (tGlMIPPI546970) | 15 | 230 | 173 | 485 | 253 |
| 24327 (tMt51186, control) | 15 | 133 | 100 | 192 | 100 |

| Construct (terminator) | N | Reproductive stage | | | | | |
|---|---|---|---|---|---|---|---|
| | | Root | | Seed Pod | | Embryo | |
| | | Average (ng/mg TSP) | % to tMt51186 control | Average (ng/mg TSP) | % to tMt51186 control | Average (ng/mg TSP) | % to tMt51186 control |
| 24321 (tGmEF1a17G18600) | 18 | 875 | 184 | 1666 | 315 | 697 | 170 |
| 24322 (tGaEF1aPI599400) | 12 | 1033 | 218 | 2343 | 443 | 616 | 150 |
| 24323 (tGtUbiPI505267) | 18 | 810 | 171 | 1588 | 300 | 463 | 113 |
| 24324 (tGcUbiPI339656) | 17 | 558 | 118 | 977 | 185 | 462 | 112 |
| 24325 (tGmMIP02G255000) | 15 | 491 | 103 | 885 | 167 | 228 | 56 |
| 24326 (tGlMIPPI546970) | 15 | 473 | 100 | 838 | 158 | 546 | 133 |
| 24327 (tMt51186, control) | 15 | 475 | 100 | 529 | 100 | 411 | 100 |

Note:
Average is Bx9 expression (ng Bx9/mg total soluble protein) in homozygous T1 plants Taken together, these data show that the six selected candidate terminators support high expression in multiple tissues and are expected to be useful in expression constructs in soybean.

What is claimed is:

1. An expression cassette comprising a nucleotide sequence having at least 99% identity with one or more of SEQ ID NO: 4 wherein the nucleotide sequence is operably linked to a heterologous nucleotide sequence.

2. An expression cassette comprising a first nucleotide sequence having at least 99% identity with one or more of SEQ ID: NO: 4 and a second nucleotide sequence having at least 99% identity with one or more of SEQ ID NO: 10, wherein the first and/or second nucleotide sequence are operably linked to a heterologous nucleotide sequence.

3. The expression cassette of claim 1, wherein the heterologous nucleotide sequence is a nucleic acid of interest that encodes an RNA or protein of interest.

4. The expression cassette of claim 3, wherein the RNA or protein of interest is capable of conferring upon a plant a desired characteristic selected from the group consisting of antibiotic resistance, virus resistance, insect resistance, disease resistance, resistance to other pests, herbicide tolerance, improved nutritional value, improved performance in an industrial process, or altered reproductive capability.

5. The expression cassette of claim 1, wherein the heterologous nucleotide sequence encodes a selectable marker or wherein the expression cassette further comprises a selectable marker.

6. A vector comprising the expression cassette of claim 1.

7. The vector of claim 6, wherein the vector is a plasmid, virus, or *Agrobacterium*.

8. A plant cell comprising the expression cassette of claim 1 or vector of claim 6.

9. The plant cell of claim 8, wherein the plant cell is a dicot cell.

10. The plant cell of claim 9, wherein the plant cell is a *Glycine max* cell.

11. A transgenic plant comprising the plant cell of claim 8.

12. The transgenic plant of claim 11, wherein the plant is a dicot.

13. The transgenic plant of claim 12, wherein the plant is a *Glycine max* plant.

14. A seed from the transgenic plant of claim 11.

15. A method, comprising introducing the expression cassette of claim 1 or vector of claim 7 into a plant or plant cell.

16. The method of claim 15, further comprising placing the plant or plant cell under conditions whereby an RNA or protein of interest and/or a selectable marker is expressed from the expression cassette or vector.

17. The method of claim 15, further comprising crossing the plant to a second plant or self-crossing the plant to produce a progeny plant.

18. A transgenic plant produced by the method of claim 15, or a plant part thereof, wherein the plant part comprises a nucleotide sequence having at least 99% identity with one or more of SEQ ID NO: 4 wherein the nucleotide sequence is operably linked to a heterologous nucleotide sequence.

19. The transgenic plant, or part thereof, of claim 18, wherein the plant is a dicot, optionally wherein the plant is a *Glycine max* plant.

* * * * *